US011971613B2

(12) United States Patent
Kliot et al.

(10) Patent No.: US 11,971,613 B2
(45) Date of Patent: Apr. 30, 2024

(54) EYEWEAR STRAP CONNECTOR

(71) Applicant: Visual Impact Films Corp., Elmsford, NY (US)

(72) Inventors: Eugene Kliot, Briarcliff Manor, NY (US); Scott Larsen, Newtown, CT (US)

(73) Assignee: Visual Impact Films Corp., Elmsford, NY (US)

( * ) Notice: Subject to any disclaimer, the term of this patent is extended or adjusted under 35 U.S.C. 154(b) by 0 days.

(21) Appl. No.: 18/201,602

(22) Filed: May 24, 2023

(65) Prior Publication Data
US 2023/0384616 A1 Nov. 30, 2023

Related U.S. Application Data

(60) Provisional application No. 63/345,721, filed on May 25, 2022.

(51) Int. Cl.
*G02C 3/00* (2006.01)
(52) U.S. Cl.
CPC .................... *G02C 3/006* (2013.01)
(58) Field of Classification Search
CPC .......... G02C 3/003; G02C 11/00; G02C 3/02; G02C 3/006
See application file for complete search history.

(56) References Cited

U.S. PATENT DOCUMENTS 2,819,650 A * 1/1958 Seron ................. G02C 3/003
24/301
4,976,531 A * 12/1990 Kahaney ............ G02C 11/00
351/156
7,399,079 B2 * 7/2008 Skuro .................. G02C 3/003
351/123

(Continued)

FOREIGN PATENT DOCUMENTS

| DE | 202011004063 U1 * | 6/2011 | ............ G02C 3/003 |
| JP | 2000509510 A * | 7/2021 | |
| WO | 2017/032770 A1 | 3/2017 | |

OTHER PUBLICATIONS

"Slingerz Premium Cork Leather Sunglass Strap", Amazon, https://www.amazon.com/SLINGERZ-Premium-Leather-Lanyard-Sunglass/dp/B08WM2MSRQ?th=1, retrieved Oct. 2, 2023 (Year: 2023).*

(Continued)

*Primary Examiner* — Christopher Stanford
(74) *Attorney, Agent, or Firm* — Rothewll, Figg, Ernst & Manbeck, P.C.

(57) ABSTRACT

Apparatus for connecting first and second eyewear ends. The apparatus may include a strap including a first strap end and a second strap end. The apparatus may also include a first connector at the first strap end. The apparatus may also include a second connector at the second strap end. The first and second connectors may include a first and second base, respectively, a first and second head, respectively, and a first shaft extending between the first base and the first head and a second shaft extending between the second base and the second head, respectively. The apparatus may also include a first fastener and a second fastener that may include a first attachment end and a second attachment end, respectively, and a first connection end and a second connection end, respectively.

19 Claims, 29 Drawing Sheets

(56) References Cited

U.S. PATENT DOCUMENTS

| | | | | |
|---|---|---|---|---|
| 7,427,133 B2 * | 9/2008 | Carter | .................... | G02C 3/006 |
| | | | | 351/158 |
| 7,896,491 B1 | 3/2011 | Lin | | |
| 8,523,350 B2 * | 9/2013 | Krisik | .................... | G02C 3/006 |
| | | | | 351/156 |
| 8,523,351 B1 * | 9/2013 | Cheong | ................. | G02C 3/003 |
| | | | | 351/123 |
| 8,931,895 B2 * | 1/2015 | Cheng | .................... | G02C 3/003 |
| | | | | D16/339 |
| 9,140,906 B1 * | 9/2015 | Wanderer | ............... | G02C 11/00 |
| 9,229,245 B2 * | 1/2016 | Carter | ................. | G02C 5/2209 |
| 9,753,304 B2 * | 9/2017 | Hadden | ................. | G02C 3/003 |
| 9,778,483 B2 * | 10/2017 | Chen | .................... | G02C 5/2209 |
| 10,042,180 B1 * | 8/2018 | Cheng | ...................... | G02C 5/20 |
| D846,630 S * | 4/2019 | Kliot | ............................ | D16/339 |
| 11,067,827 B2 * | 7/2021 | Masters | ................... | A42B 1/24 |
| 11,209,666 B2 * | 12/2021 | Necklas | ................. | G02C 3/006 |
| 2009/0303431 A1 * | 12/2009 | Ifergan | .................... | G02C 5/10 |
| | | | | 351/153 |
| 2012/0307199 A1 | 12/2012 | Krisik et al. | | |
| 2016/0252749 A1 | 9/2016 | Necklas | | |
| 2018/0059433 A1 | 3/2018 | Hadden et al. | | |

OTHER PUBLICATIONS

"Slingerz", Facenook, https://www.facebook.com/SlingerzUSA, retrieved Oct. 2, 2023 (Year: 2023).*

* cited by examiner

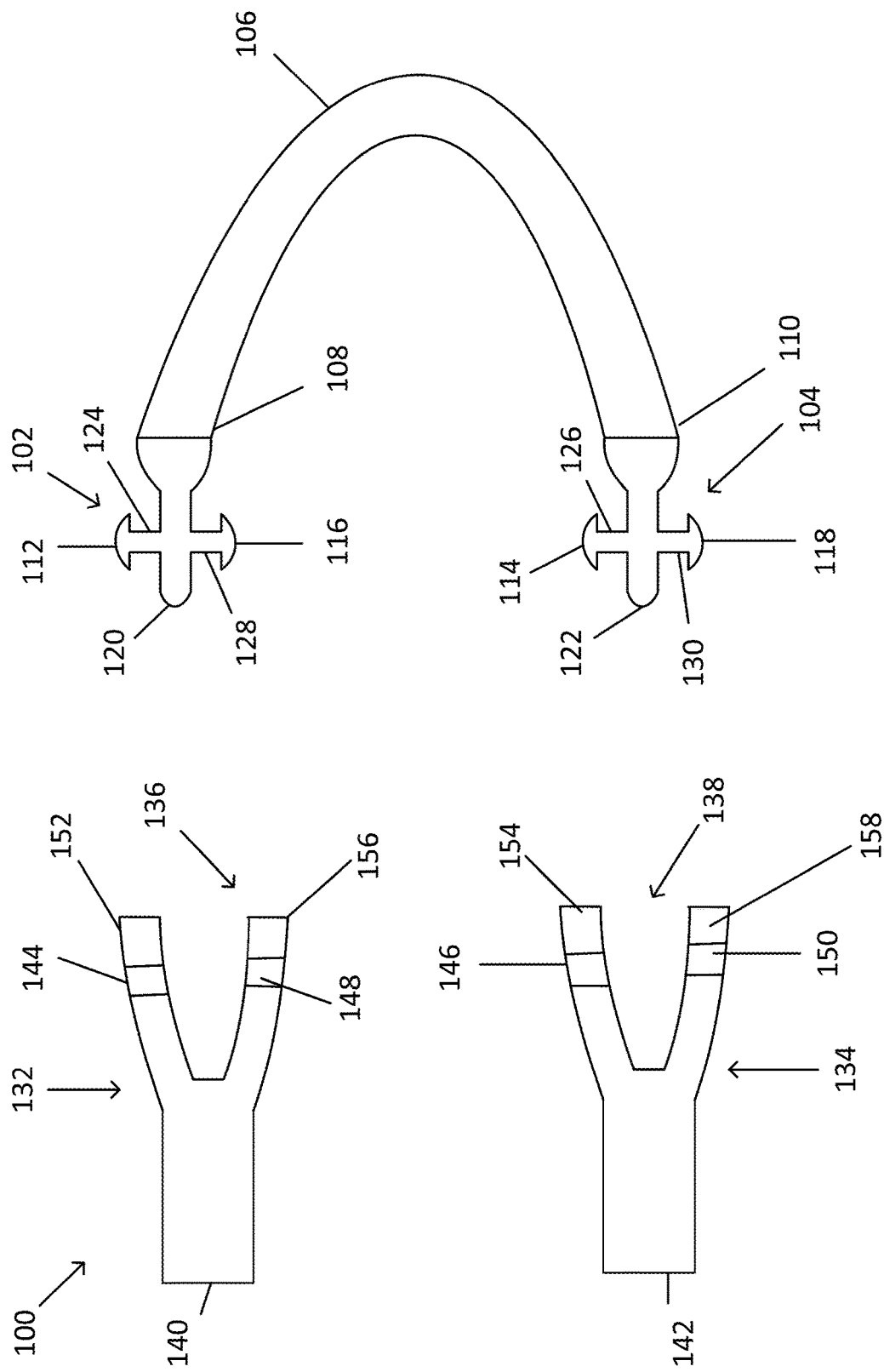

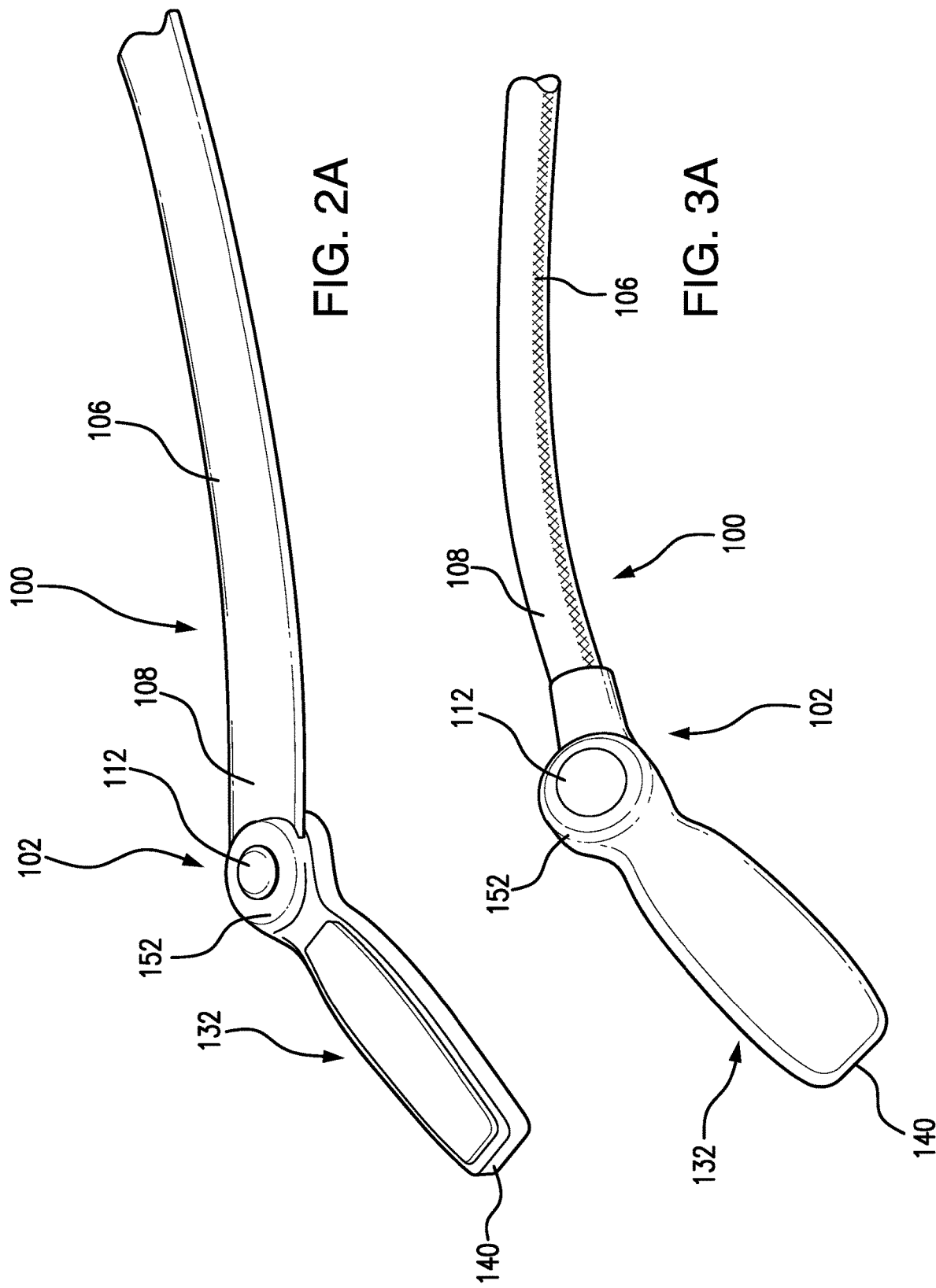

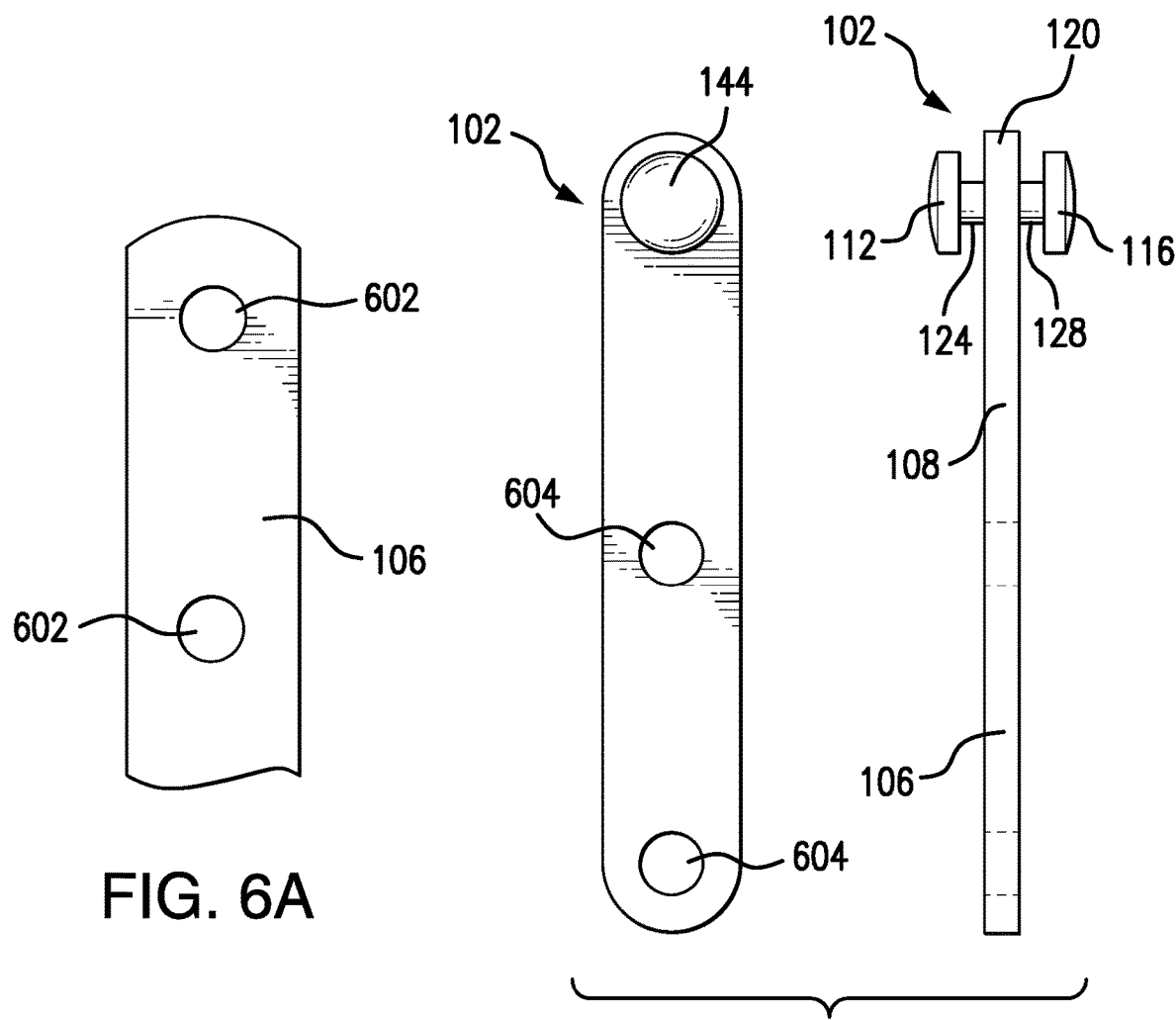

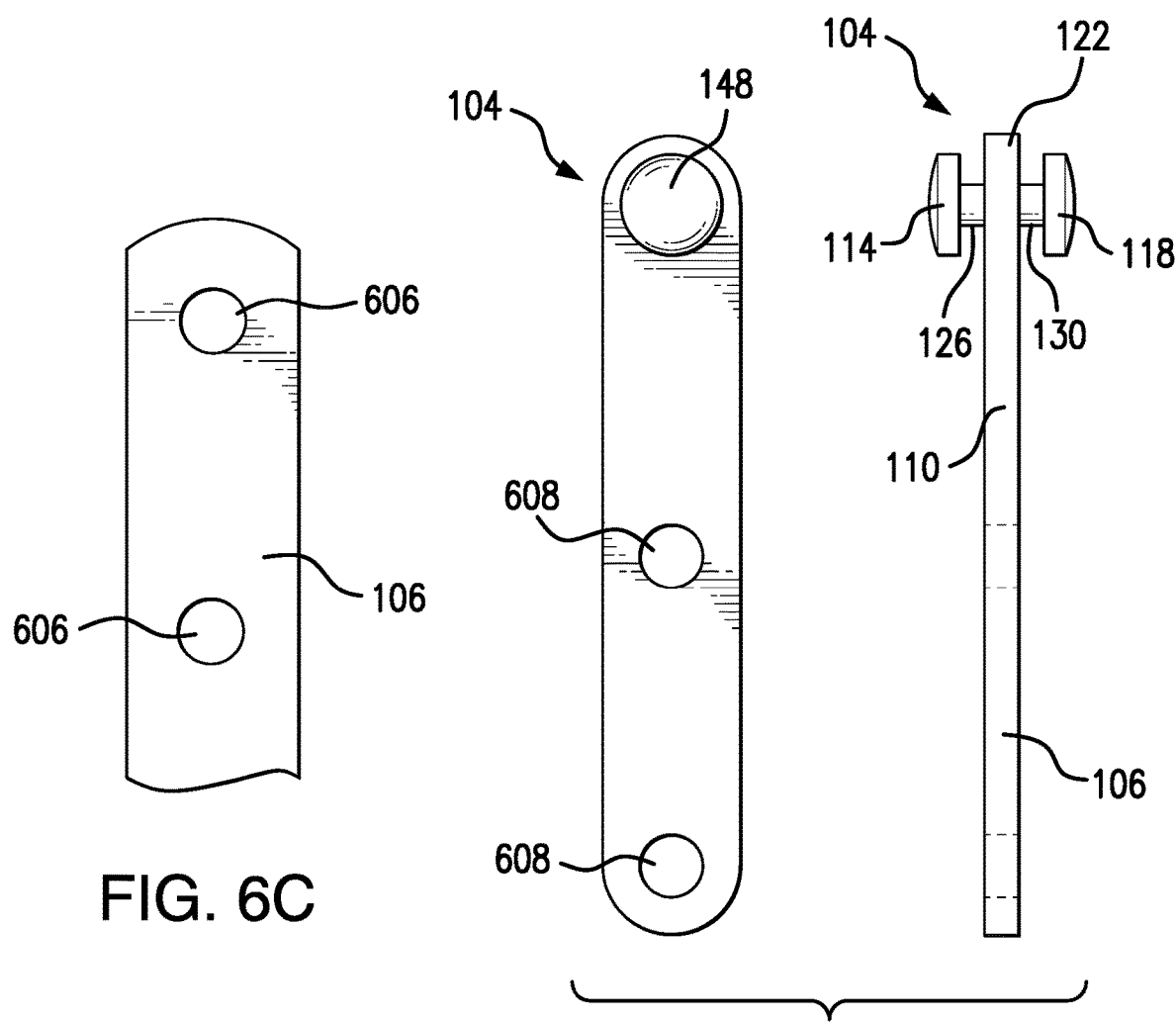

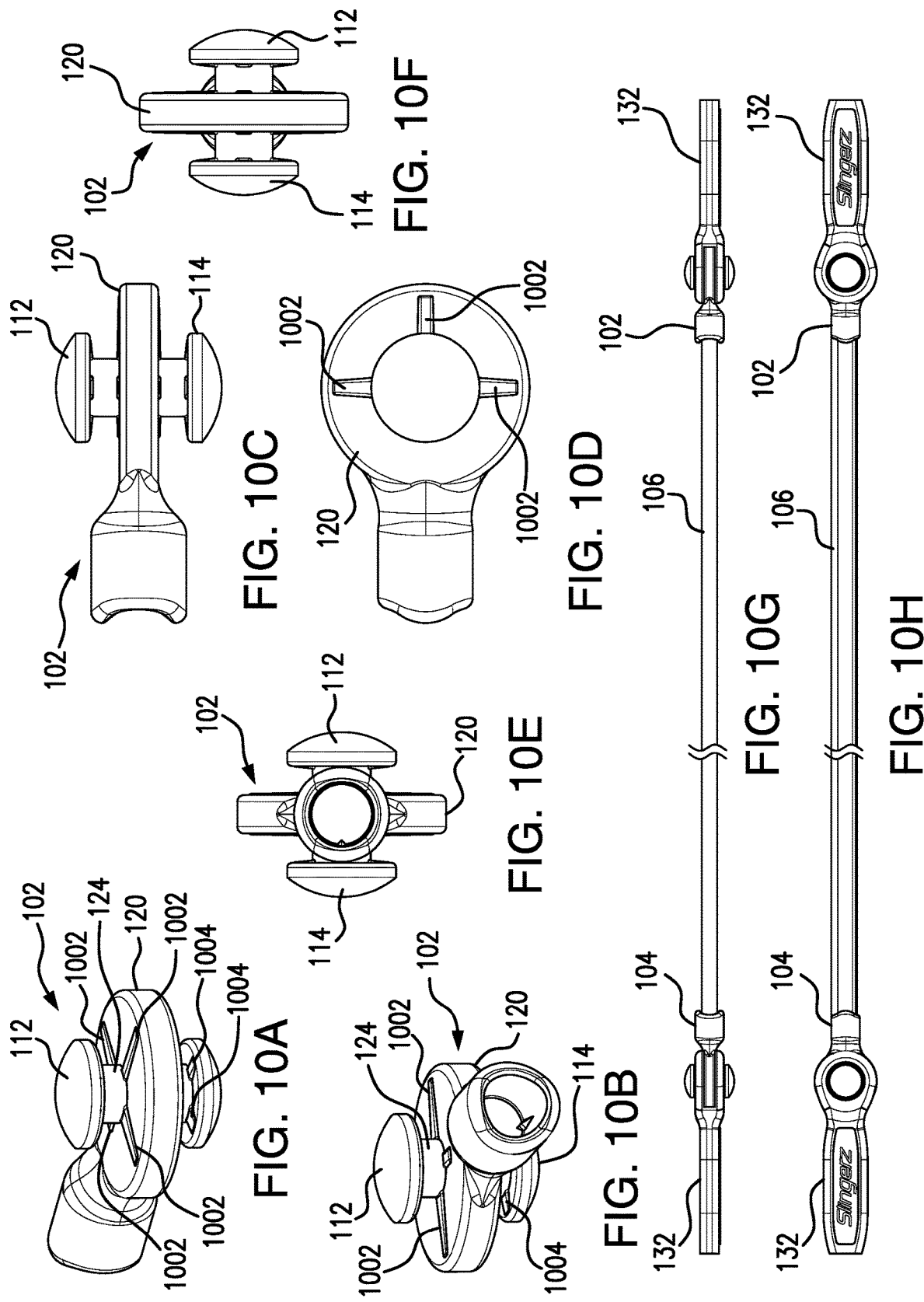

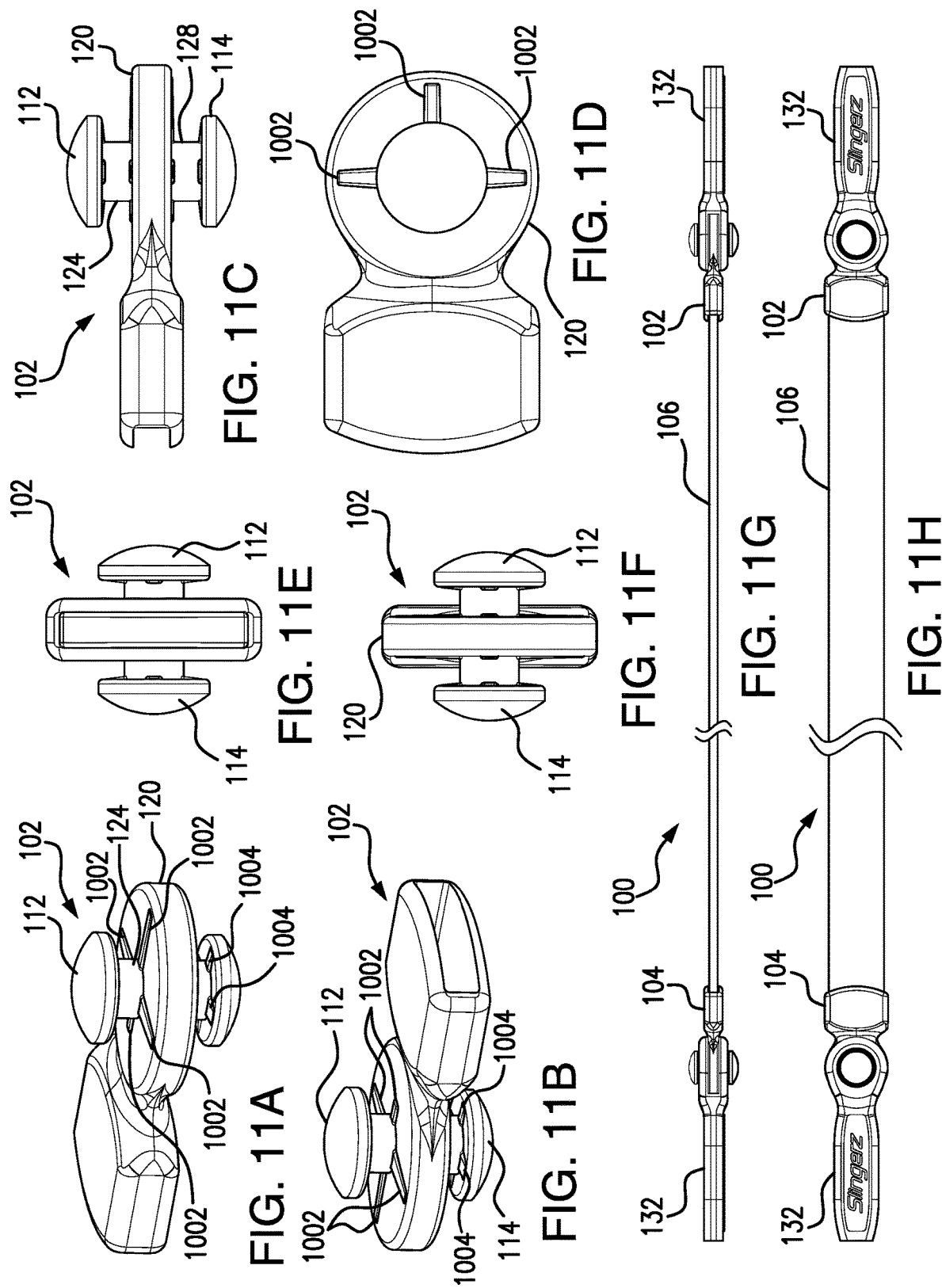

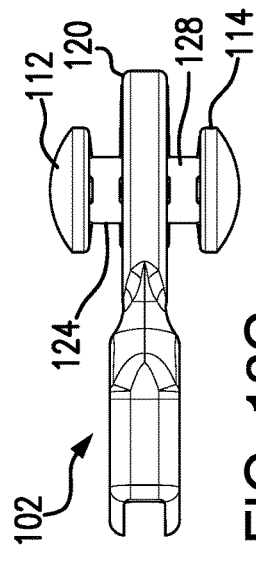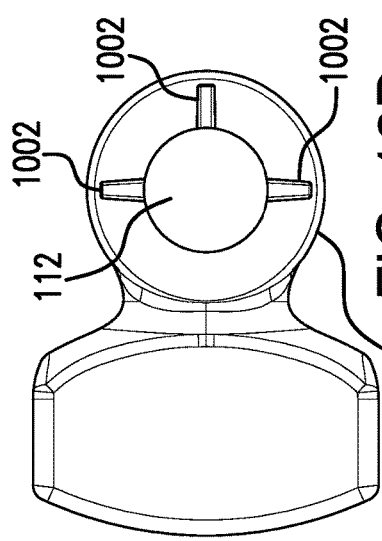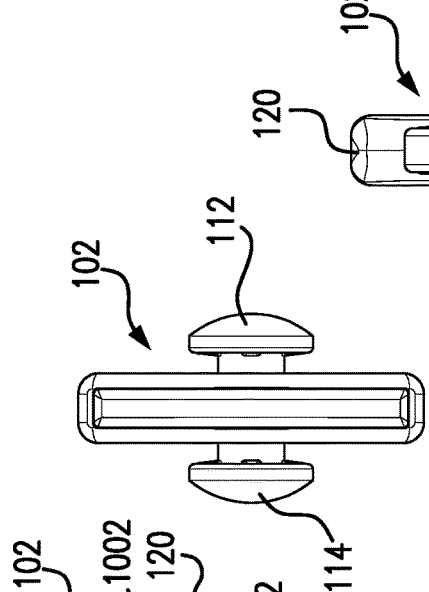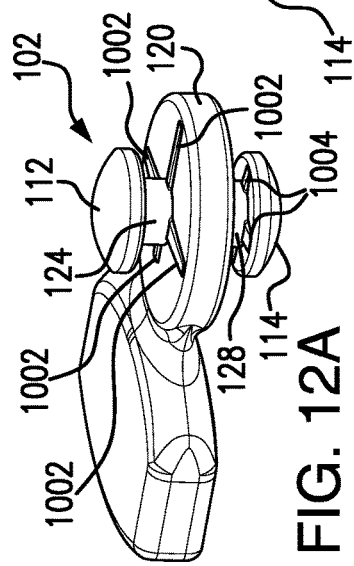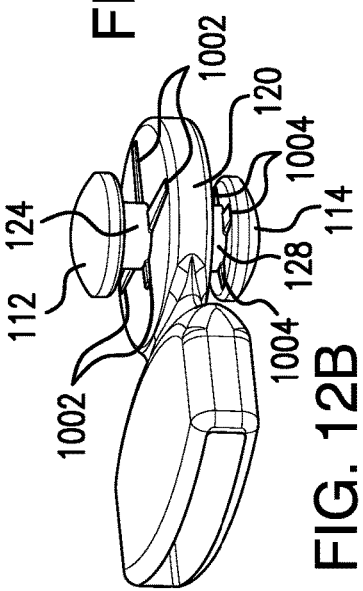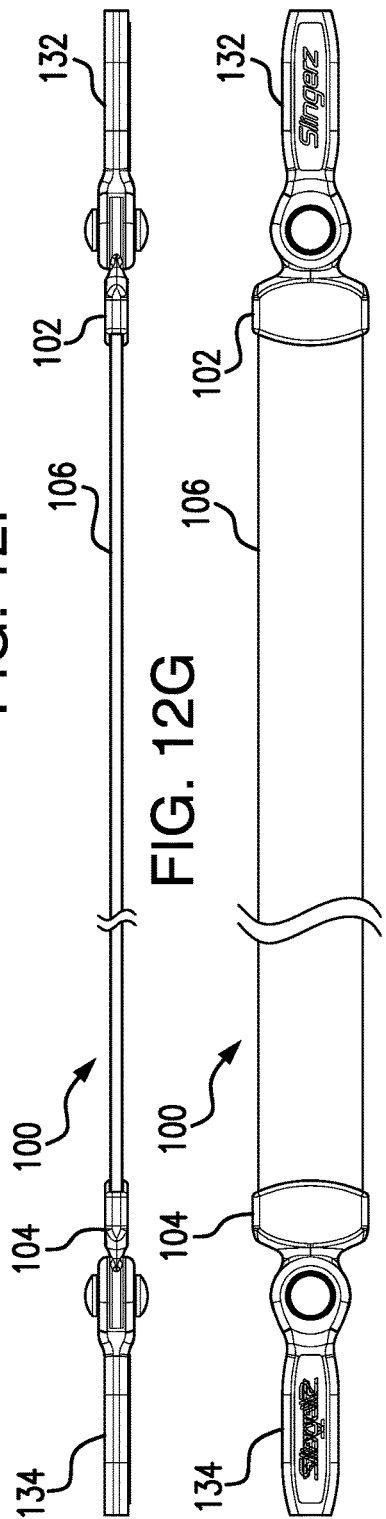

EYEWEAR STRAP CONNECTOR

CROSS-REFERENCE TO RELATED APPLICATION

The present application claims the benefit of priority to U.S. Provisional Application Ser. No. 63/345,721, filed on May 25, 2022, which is incorporated herein by reference in its entirety.

BACKGROUND

Field of Invention

The present disclosure relates to apparatuses for connecting ends of an eyewear to secure the eyewear to an individual's head.

Discussion of the Background

Eyewear connectors may be used to connect the ends of an eyewear (such as sunglasses) and then secure the eyewear to a person's head. A strap may connect the ends of a pair of glasses, and the strap may then hang behind a person's head to secure the eyewear to a person's head, or to allow the person to remove the eyewear and so that the glasses hang around the person's neck. Due to the differences in individual needs and desires, a single-sized strap may not be sufficient for everyone. Further, difficulties may arise when the eyewear connector is not effectively connected to the ends of the eyewear.

SUMMARY

One aspect of the invention may provide an apparatus for connecting first and second eyewear ends. The apparatus may include a strap including a first strap end and a second strap end. The apparatus may also include a first connector at the first strap end. The first connector may include a first base, a first head, and a first shaft extending between the first base and the first head. The apparatus may also include a second connector at the second strap end. The second connector may include a second base, a second head, and a second shaft extending between the second base and the second head. The apparatus may also include a first fastener including a first attachment end and a first connection end. The first attachment end may be configured to attach removably to the first eyewear end. The first connection end may include a first connection layer and a first hole through the first connection layer, the first shaft of the first connector may extend through the first hole of the first connection end of the first fastener, and the first connection layer may be between the first base and the first head of the first connector. The apparatus may additionally include a second fastener including a second attachment end and a second connection end. The second attachment end may be configured to attach removably to the second eyewear end. The second connection end may include a second connection layer and a second hole through the second connection layer. The second shaft of the second connector may extend through the second hole of the second connection end of the second fastener, and the second connection layer may be between the second base and the second head of the second connector.

In some aspects, the first connector may include a third head and a third shaft extending between the first base and the third head. The second connector may also include a fourth head and a fourth shaft may extend between the second base and the fourth head. The first connection end of the first fastener may include a third connection layer and a third hole through the third connection layer. The third shaft of the first connector may extend through the third hole of the first connection end of the first fastener, and the third connection layer is between the first base and the third head of the first connector. The second connection end of the second fastener may also include a fourth connection layer and a fourth hole through the fourth connection layer. The fourth shaft of the second connector may extend through the fourth hole of the second connection end of the second fastener, and the fourth connection layer may be between the second base and the fourth head of the first connector. In some aspects, the first and third shafts may be coaxial and the second and fourth shafts may be coaxial.

In some aspects, the strap may include the first and second connectors. The first connector may be integral with the first strap end, and the second connector may be integral with the second strap end. In some alternative aspects, the first connector may be attached to the first strap end of the strap, and the second connector may be attached to the second strap end of the strap.

In some aspects, the first and second shafts may be cylindrical. In some aspects, the first and second heads may be dome-shaped.

In some aspects, the first head may include a flat surface that faces the first base, and the second head may include a flat surface that faces the second base.

In some aspects, the first base may include a surface that faces the first head, the second base may include a surface that faces the second head, the first head may include a surface that faces the first base, and the second head may include a surface that faces the second base. In some aspects, the surfaces of the first and second bases that face the first and second heads, respectively, may be textured surfaces, and/or the surfaces of the first and the second head that face the first and second bases, respectively, may be textured surfaces.

In some aspects, the first head may include a surface that faces the first base, the surface of the first head that faces the first base may include one or more ridges, the second head may include a surface that faces the second base, and the surface of the second head that faces the first base may include one or more ridges. In some aspects, the first base may include a surface that faces the first head, the surface of the first base may include one or more ridges, the second base may include a surface that faces the second head, and the surface of the second base may include one or more ridges.

In some aspects, the first and the second connectors may be metal. In some aspects, the first and second fasteners may include rubber or elastic materials. In some aspects, the strap may include cork, foam, rubber, plastic, metal, and/or fiber.

In some aspects, the first and second connectors may be molded pieces, the first strap end of the strap may be overmolded on the first connector, and the second strap end of the strap may be overmolded on the second connector. In some aspects, the first and second connectors may be plastic, and the strap may be silicone, foam, or rubber.

In some aspects, the first strap end of the strap may be inserted into the first connector, and the second strap end of the strap may be inserted into the second connector.

In some aspects, the first and second strap ends may be adhered to the first and second connectors, respectively.

In some aspects, the first connector may include one or more first connector holes, the second connector may include one or more second connector holes, the first strap end of the strap may include one or more first strap holes, the second strap end of the strap may include one or more second strap holes. In some aspects, the apparatus may further include one or more first rivets through the one or more first connector holes and the one or more first strap holes. The one or more first rivets may be configured to attach the first connector to the first strap end of the strap. The apparatus may further include one or more second rivets through the one or more second connector holes and the one or more second strap holes. The one or more second rivets may be configured to attach the second connector to the second strap end of the strap.

In some aspects, the first connector may further include a platform and one or more connector stakes each extending from the platform, the first strap end of the strap may include one or more first strap holes, and the one or more connector stakes may each extend through a respective first strap hole of the one or more first strap holes. In some aspects, the first connector may further include one or more connector heads, the one or more connector stakes may each extend from the platform to a connector head of the one or more connector heads, and the first strap end of the strap may be between the one or more connector heads and the platform.

In some aspects, the strap may be a round strap. In some alternative aspects, the strap may be a flat strap. In some further alternative aspects, the strap may be an oval strap.

In some aspects, the strap may include a first strap component and a second strap component. In some aspects, the first strap component may include the first strap end and a first strap holder. In some aspects, the second strap component may include the second strap end and a second strap holder. In some aspects, the first strap component may pass through the second strap holder, and the second strap component may pass through the first strap holder.

In some aspects, the length of the strap may be adjustable.

Another aspect of the invention may provide a strap including a first strap component, a second strap component, a first connector, and a second connector. The first strap component may include a first strap end and a first strap holder. The second strap component may include a second strap end and a second strap holder. The first strap component may pass through the second strap holder, and the second strap component may pass through the first strap holder. The first connector may be at the first strap end, and the second connector may be at the second strap end.

In some aspects, the first connector may include a first base, a first head, and a first shaft extending between the first base and the first head. In some aspects, the second connector may include a second base, a second head, and a second shaft extending between the second base and the second head. In some aspects, the first connector may further include a third head and a third shaft extending between the first base and the third head. In some aspects, the second connector may further include a fourth head and a fourth shaft extending between the second base and the fourth head. In some aspects, the length of the strap may be adjustable.

These and other embodiments encompassed within the apparatus are described in the detailed description below.

BRIEF DESCRIPTION OF THE DRAWINGS

The accompanying drawings, which are incorporated herein and form part of the specification, illustrate various, non-limiting embodiments of the present disclosure. In the drawings, like reference numbers indicate identical or functionally similar elements.

FIG. 1 is a cross-sectional side view illustrating the components of a non-limiting example of an apparatus for connecting first and second eyewear ends according to some aspects.

FIGS. 2A and 2B are perspective partial views illustrating a non-limiting example of an apparatus including a connector that is integral with a strap (with and without a fastener attached to the connector, respectively) according to some aspects.

FIGS. 3A and 3B are perspective partial views illustrating a non-limiting example of an apparatus including a connector that is attached to a strap (with and without a fastener attached to the connector, respectively) according to some aspects.

FIGS. 6A and 6C top views of a non-limiting example of an apparatus including one or more connector holes in first and second connectors, respectively, and one or more strap holes in a strap for attaching the first and second connectors and the strap using one or more rivets according to some aspects. FIGS. 6B and 6D are side views of the first and second connectors, respectively, including the one or more strap holes according to some aspects.

FIGS. 10A-10F are perspective, perspective, side, top, rear, and front views, respectively, of a connector including one or more ridges according to some aspects. FIGS. 10G and 10H are side and top views, respectively, of an apparatus including first and second connectors each including one or more ridges according to some aspects.

FIGS. 11A-11F are perspective, perspective, side, top, rear, and front views, respectively, of a connector including one or more ridges according to some aspects. FIGS. 11G and 11H are side and top views, respectively, of an apparatus including first and second connectors each including one or more ridges according to some aspects.

FIGS. 12A-12F are perspective, perspective, side, top, rear, and front views, respectively, of a connector including one or more ridges according to some aspects. FIGS. 12G and 12H are side and top views, respectively, of an apparatus including first and second connectors each including one or more ridges according to some aspects.

DETAILED DESCRIPTION

Figure 2B:
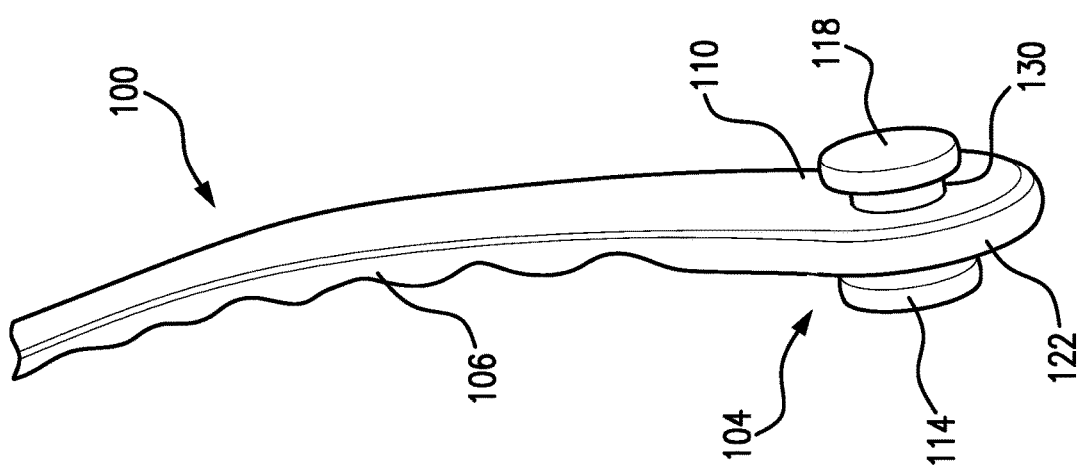
Figure 3D:
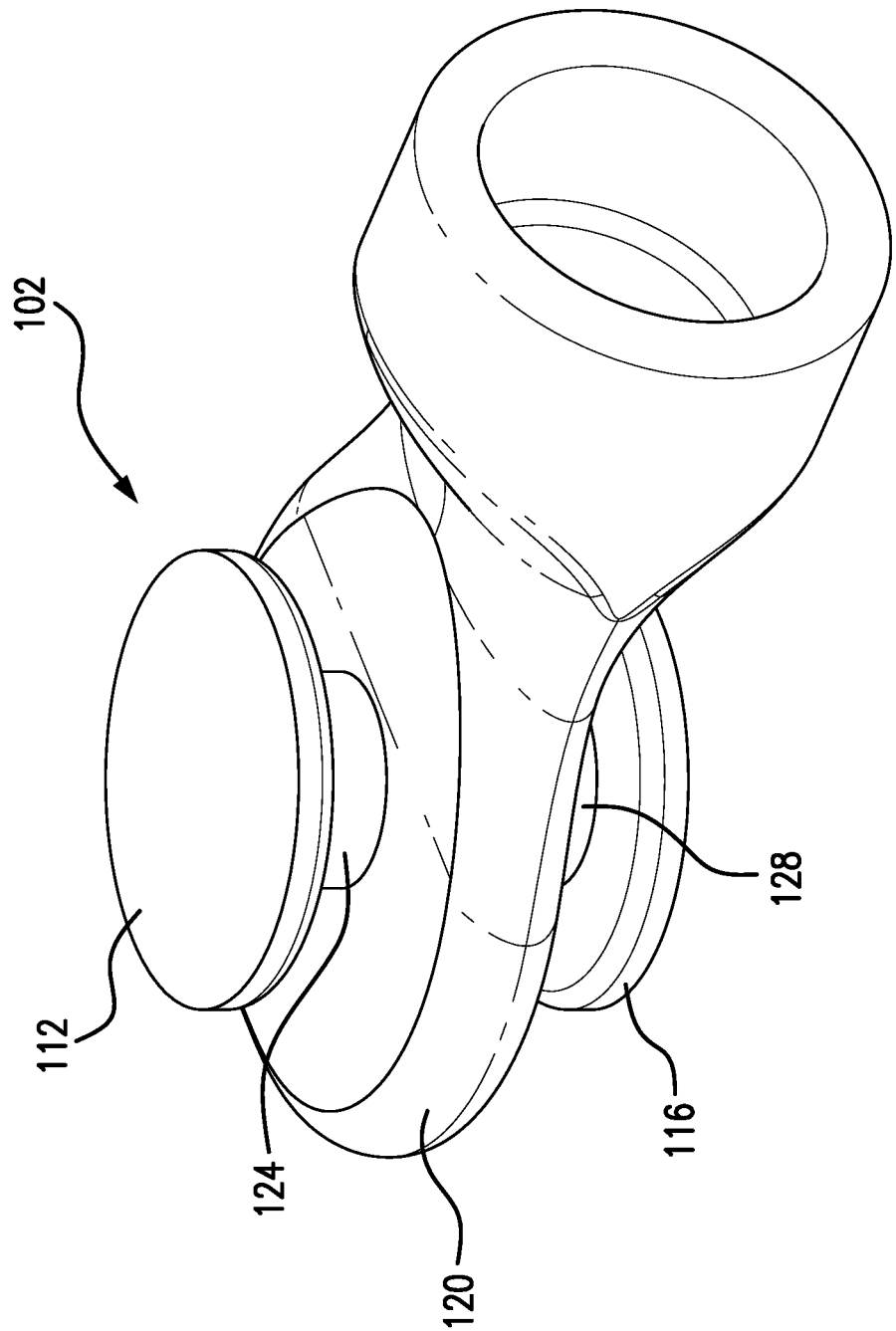
Figure 3E:
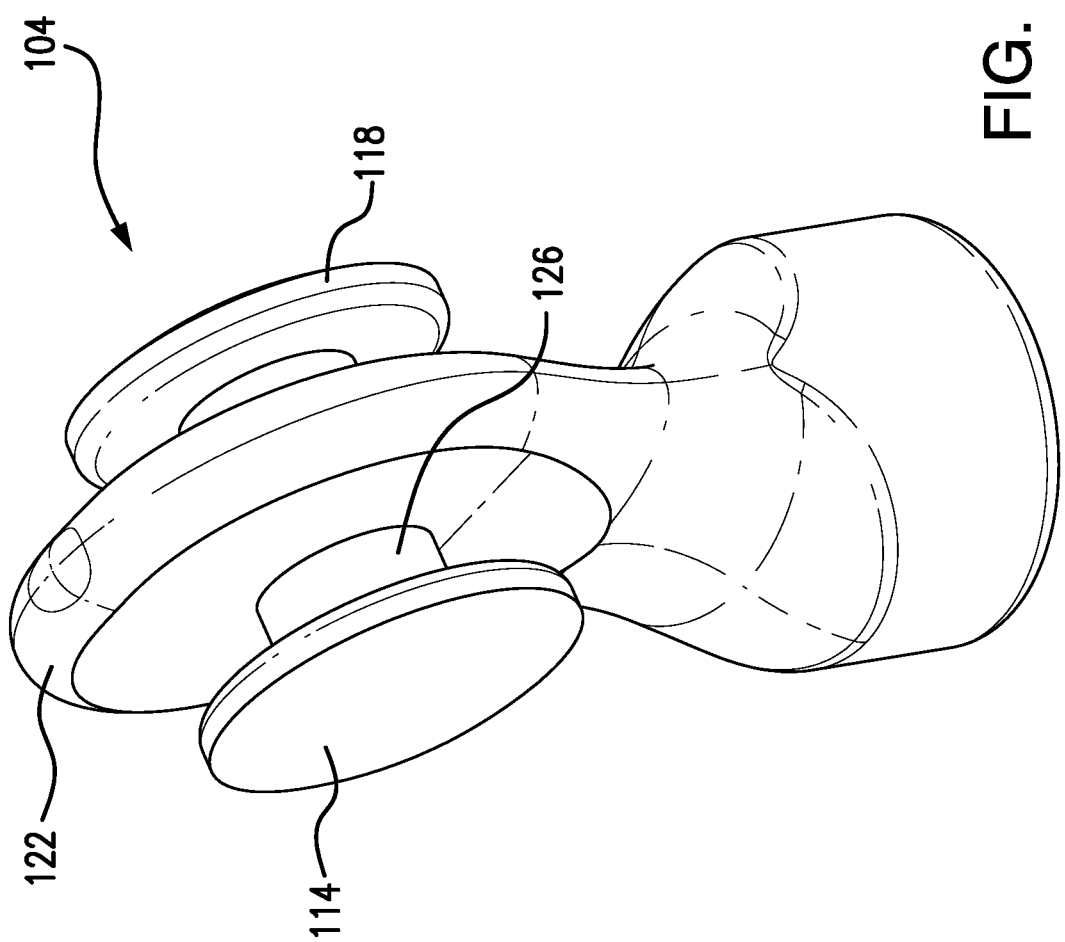

FIG. 1 is a cross-sectional side view illustrating an apparatus 100 embodying aspects of the present invention. In some aspects, the apparatus 100 may be for connecting first and second eyewear ends of eyewear (e.g., reading glasses or sunglasses). In some aspects, the apparatus 100 may include one or more of a first connector 102, a second connector 104, a strap 106, a first fastener 132, and a second fastener 134. In some aspects, the strap 106 may include a first strap end 108 and a second strap end 110. In some aspects, the first connector 102 may be at the first strap end 108 of the strap 106, and the second connector 104 may be at the second strap end 110 of the strap 106. In some aspects, the first connector 102 may include a first base 120, a first head 112, and a first shaft 124 extending between the first base 120 and the first head 112. In some aspects, the second connector 104 may include a second base 122, a second head 114, and a second shaft 126 extending between the second base 122 and the second head 114. In some aspects, the first and second shafts 124, 126 may be cylindrical. However, this is not required, and, in some alternative aspects, the first and second shafts 124 and 126 may have a different shape. In some aspects, as shown in FIGS. 1, 3A-3E, 4A, 4B, 5A-5D, 6B, 6D, and 7D, the first and second heads 112 and 114 may be dome-shaped. However, this is not required, and, in some alternative aspects, the first and second heads 112 and 114 may have a different shape. For example, in some alternative aspects, as shown in FIGS. 2A and 2B, the top surfaces of the first and second heads 112 and 114 may include at least a flat portion.

In some aspects, as shown in FIG. 1, the first fastener 132 may include a first attachment end 140 and a first connection end 136. The first attachment end 140 may be configured to attach removably to the first eyewear end of the eyewear. The first connection end 136 may include a first connection layer 152 and a first hole 144 through the first connection layer 152. In some aspects, as shown in FIGS. 2A, 3A, 4A, 7A, and 7B, the first shaft 124 of the first connector 102 may extend through the first hole 144 of the first connection end 136 of the first fastener 132, and the first connection layer 152 may be between the first base 120 and the first head 112 of the first connector 102. In some aspects, the first fastener 132 may be connected to the first connector 102 in this way.

Figure 7A:
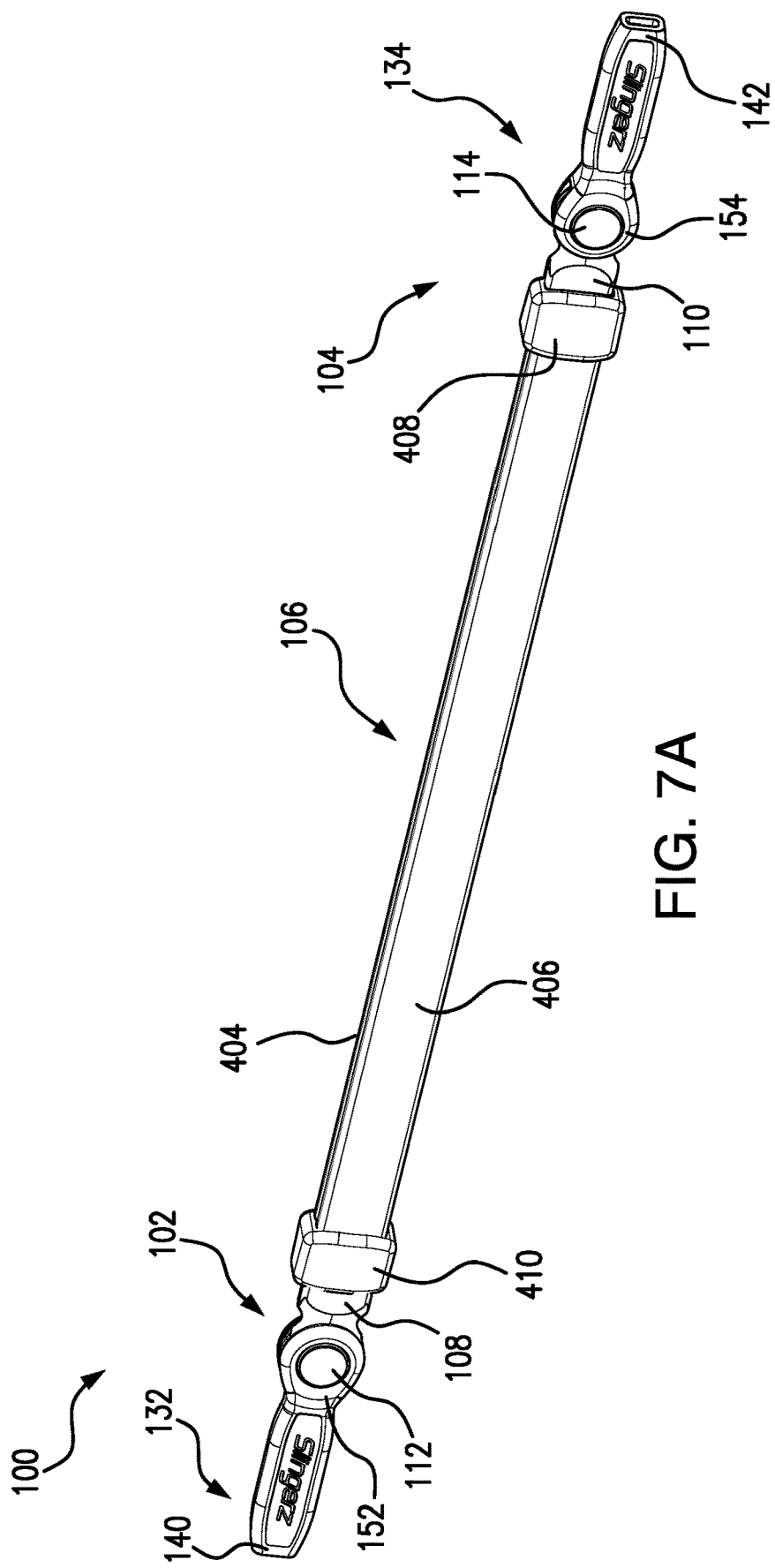
FIGS. 7A and 7B are perspective views of a non-limiting example of an apparatus including an adjustable length strap according to some aspects.
Figure 7B:
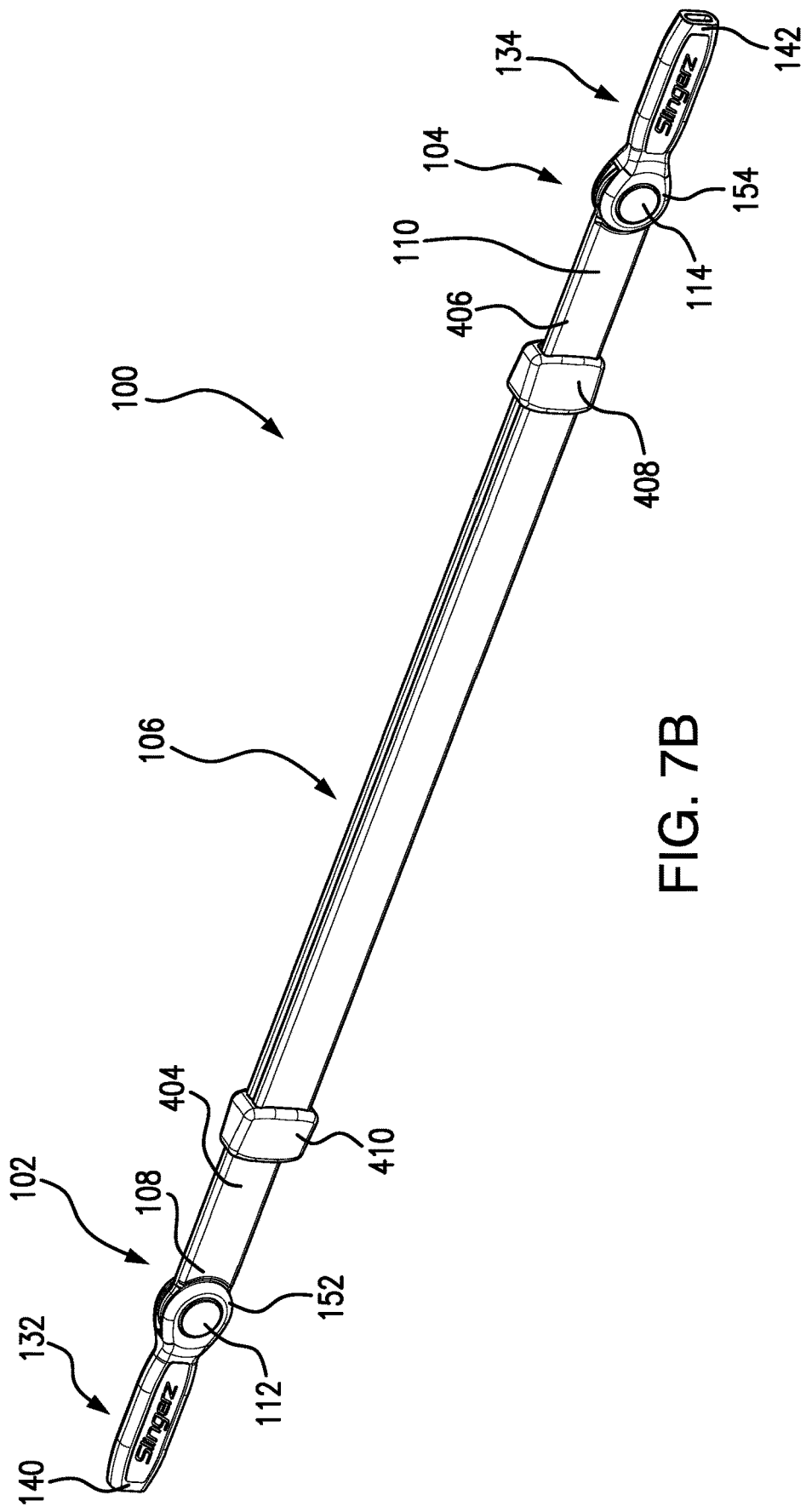

In some aspects, the second fastener 134 may include a second attachment end 142 and a second connection end 138. The second attachment end 142 may be configured to attach removably to the second eyewear end. The second connection end 138 may include a second connection layer 154 and a second hole 146 through the second connection layer 154. In some aspects, as shown in FIGS. 7A, 7B, and 7D, the second shaft 126 of the second connector 104 may extend through the second hole 146 of the second connection end 138 of the second fastener 134, and the second connection layer 154 may be between the second base 122 and the second head 114 of the second connector 104. In some aspects, the second fastener 134 may be connected to the second connector 104 in this way.

In some aspects, as shown in FIG. 1, the first connector 102 may include a third head 116 and a third shaft 128 extending between the first base 120 and the third head 116. In some aspects, the second connector 104 may include a fourth head 118 and a fourth shaft 130 extending between the second base 122 and the fourth head 118. In some aspects, as shown in FIG. 1, the first connection end 136 of the first fastener 132 may include a third connection layer 156 and a third hole 148 through the third connection layer 156. In some aspects, when the first connector 102 is connected to the first fastener 132, the third shaft 128 of the first connector 102 may extend through the third hole 148 of the first connection end 136 of the first fastener 132, and the third connection layer 156 may be between the first base 120 and the third head 116 of the first connector 102. In some aspects, the second connection end 138 of the second fastener 134 may include a fourth connection layer 158 and a fourth hole 150 through the fourth connection layer 158. In some aspects, when the second connector 104 is connected to the second fastener 134, the fourth shaft 130 of the second connector 104 may extend through the fourth hole 150 of the second connection end 138 of the second fastener 134, and the fourth connection layer 158 may be between the second base 122 and the fourth head 118 of the second connector 104. In some aspects, as shown in FIGS. 1, 3D, 5D, and 6B, the first and third shafts 124 and 128 of the first connector 102 may be coaxial. In some aspects, as shown in FIG. 1, the second and fourth shafts 126 and 130 of the second connector 104 may be coaxial.

In some aspects, components of the apparatus 100 may be made from one or more of a variety of materials. For example, in some aspects, the first and the second connectors 102, 104 may be metal (e.g., stainless steel). However, this is not required, and, in some alternative aspects, the first and second connectors 102, 104 may be plastic. In some aspects, the strap 106 may include silicone, cork, foam, rubber, plastic, metal (e.g., stainless steel), and/or fiber.

Figure 4A:
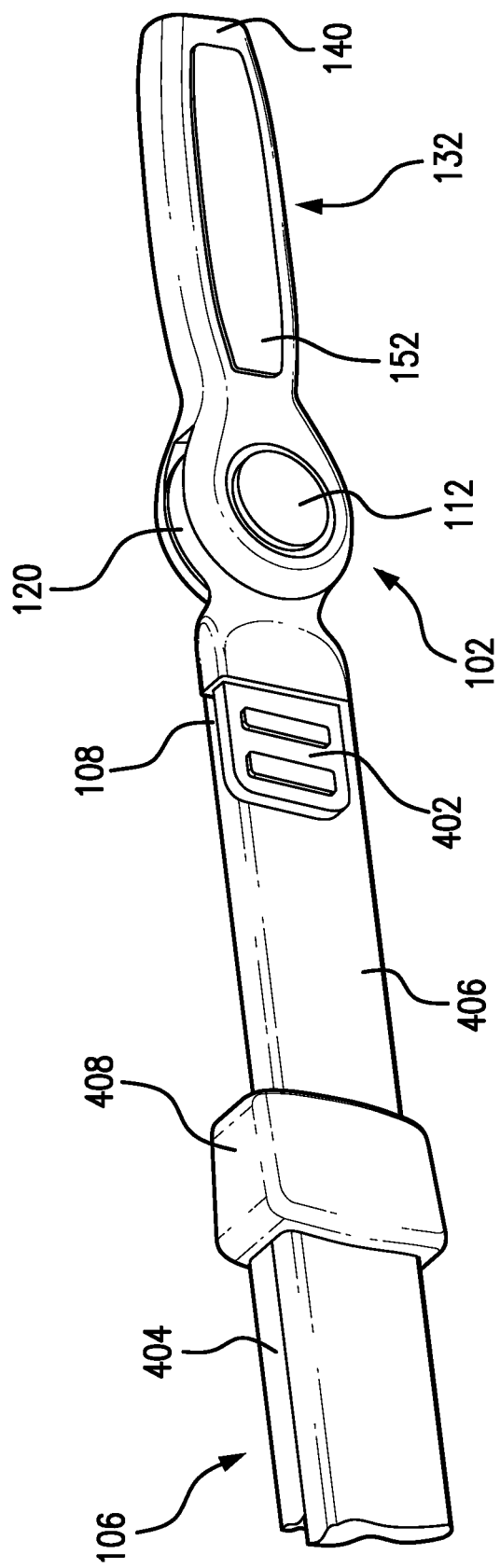
FIGS. 4A and 4B are perspective partial views of a non-limiting example of an apparatus including a strap that is overmolded on a connector (with and without a fastener attached to the connector, respectively) according to some aspects.
Figure 4B:
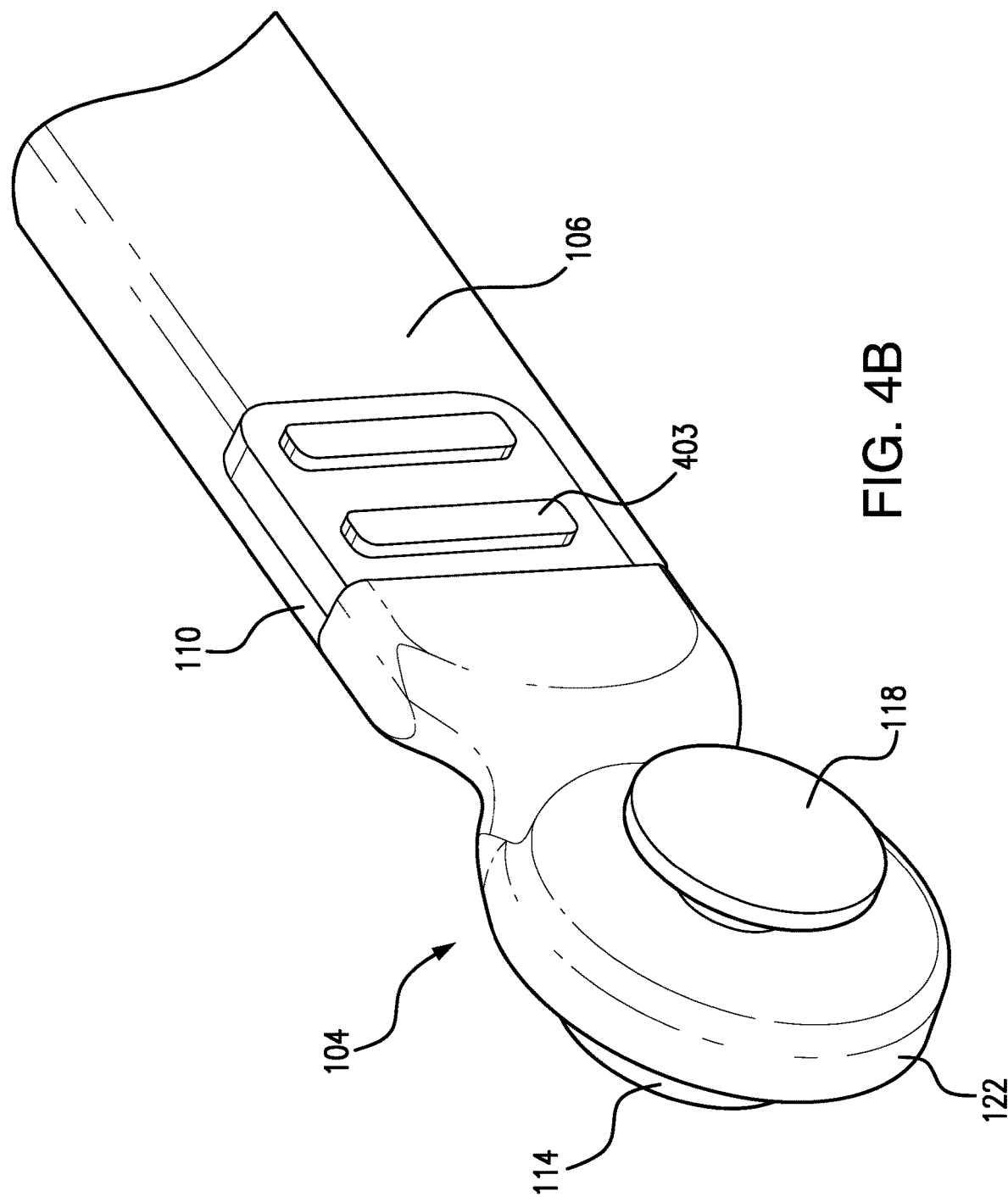

In some aspects, as shown in FIGS. 2A, 2B, 4A, and 4B, the first connector 102 and/or the second connector 104 may be integral with the strap 106. FIG. 2A shows the first connector 102 with the first fastener 132 attached, and FIG. 2B shows the second connector 104 without the second fastener 134 attached. In some aspects, the first connector 102 may be integral with the first strap end 108 (as shown in FIGS. 2A and 4A), and the second connector 104 may be integral with the second strap end 110 (as shown in FIGS. 2B and 4B). In some aspects, the integration of the first and second connectors 102 and 104 with the first and second strap ends 108 and 110 may provide increased security and/or may prevent the first and second connectors 102 and 104 from disconnecting from the strap 106.

In some aspects in which the first connector 102 and/or the second connector 104 is integral with the strap 106, as shown in FIGS. 4A and 4B, the strap 106 may be overmolded on the first connector 102 and/or the second connector 104. FIG. 4A shows the strap 106 overmolded on the first connector 102 with the first fastener 132 connected to the first connector 102, and FIG. 4B shows the strap 106 overmolded on the second connector 104 without the second fastener 134 connected to the second connector 104. In some overmolded aspects, as shown in FIGS. 4A and 4B, the first and second connectors 102 and 104 may be molded pieces. In some overmolded aspects, as shown in FIG. 4A, the first strap end 108 of the strap 106 may be overmolded on the first connector 102, creating a molded piece 402. In some overmolded aspects, as shown in FIG. 4B, the second strap end 110 of the strap 106 may be overmolded on the second connector 104, creating a molded piece 403.

However, it is not required that the first and second connectors 102 and 104 be integral with the strap 106, and, in some alternative aspects, as shown in FIGS. 3A, 3B, 5A-5D, 6A-6D, and 9A-9D, the first connector 102 and/or the second connector 104 may be attached to the strap 106. FIG. 3A shows the first connector 102 with the first fastener 132 attached, and FIG. 3B shows the second connector 104 without the second fastener 134 attached.

In some aspects in which the first connector 102 and/or the second connector 104 is attached to the strap 106 (e.g., as shown in FIGS. 3A, 3B, and 5A-5C), the first connector 102 may be attached to the first strap end of the strap 108, and/or the second connector 104 may be attached to the second strap end 110 of the strap 106. In some aspects, the first and second strap ends 108 and 110 may be adhered to the first and second connectors 102 and 104, respectively (e.g., using an adhesive). In some aspects, the first and second strap ends 108 and 110 may be additionally or alternatively attached to the first and second connectors 102 and 104, respectively, in another manner (e.g., by crimping ends of the first and second connectors 102 and 104 into which the first and second strap ends 108 and 110 have been inserted).

Figure 3C:
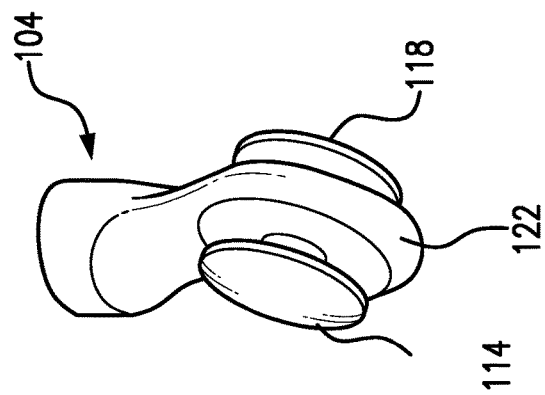
FIGS. 3C, 3D, and 3E are perspective views of the connector that is configured to attach to the strap according to some aspects.
Figure 3B:
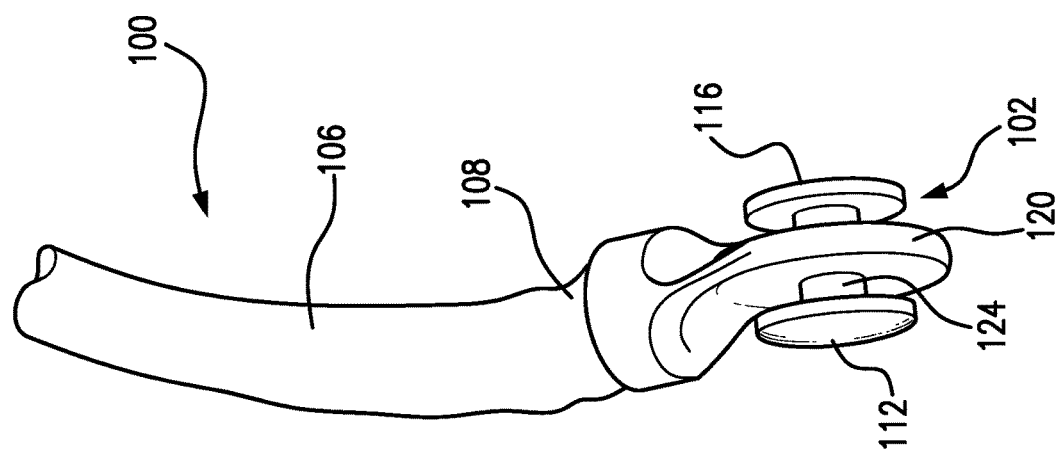
Figure 5A:
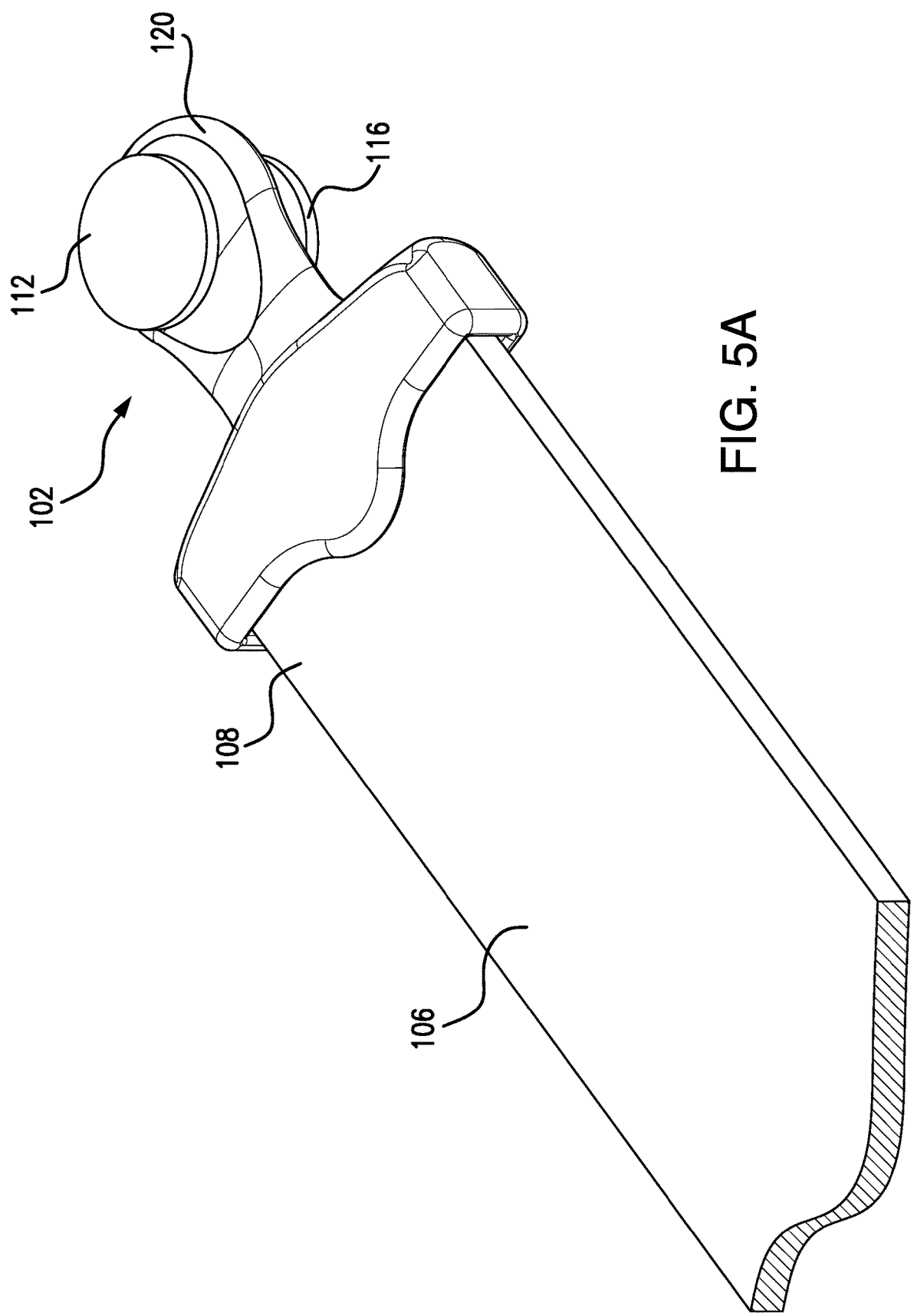
FIGS. 5A, 5B, and 5C are perspective partial views
Figure 5B:
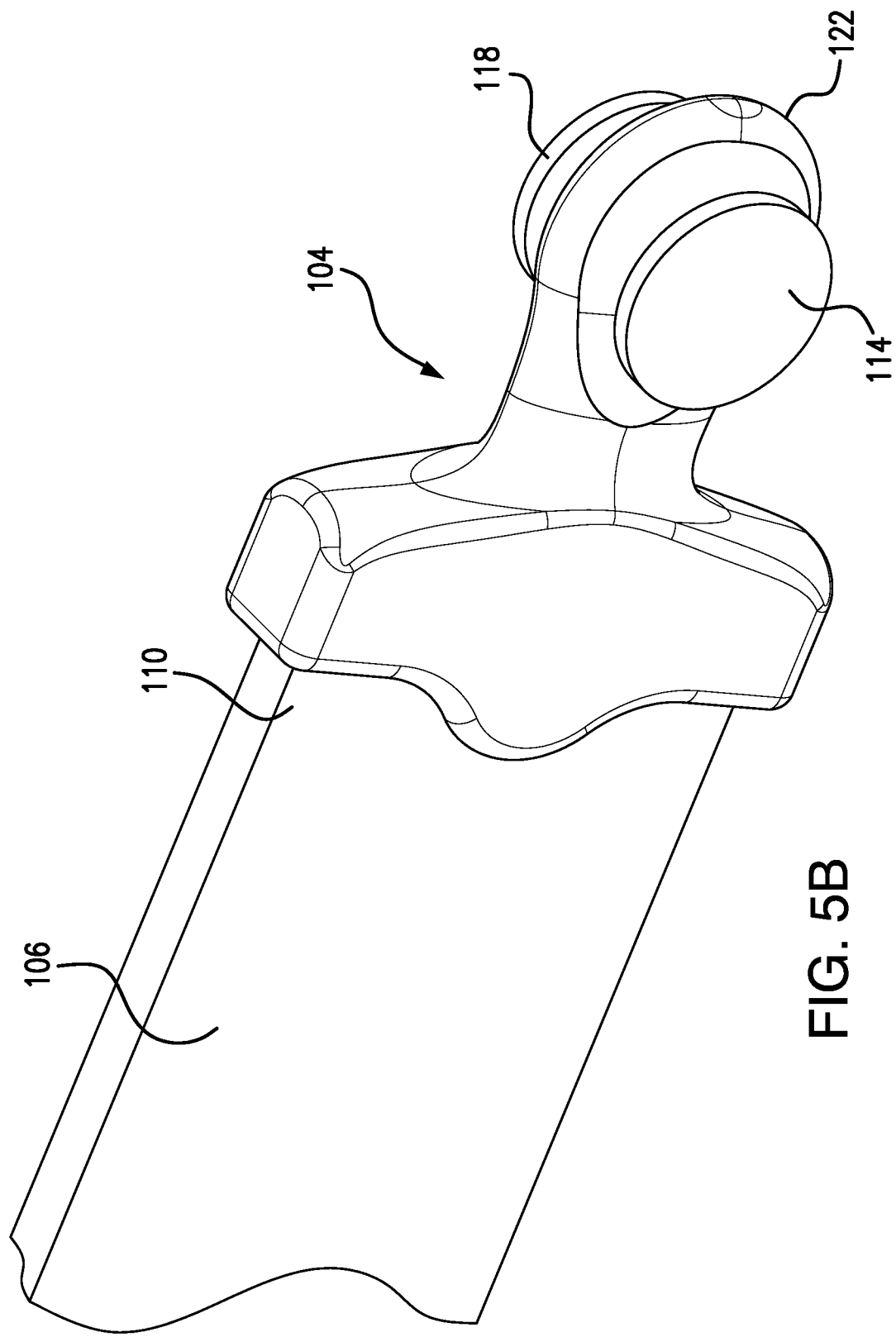
Figure 5C:
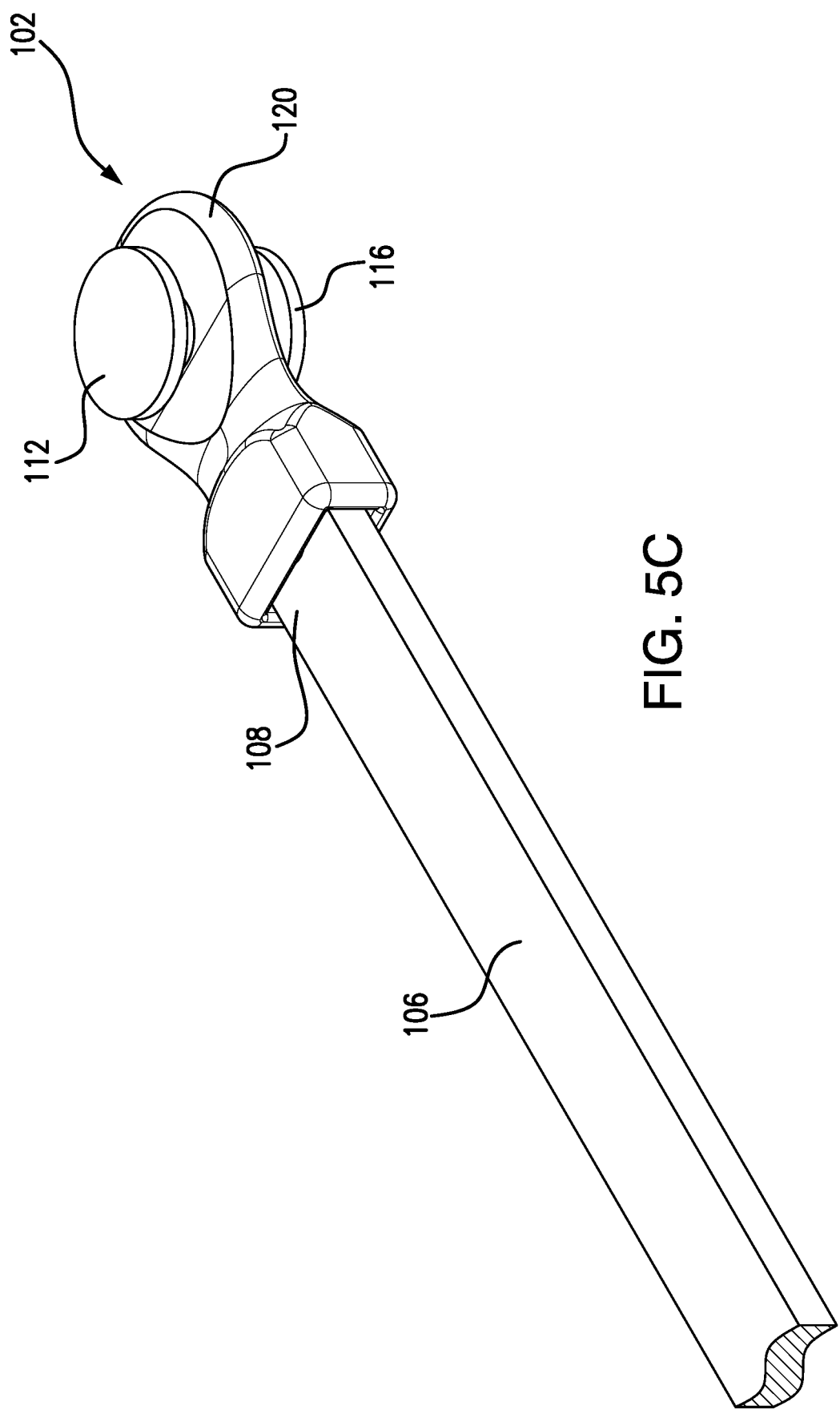
Figure 5D:
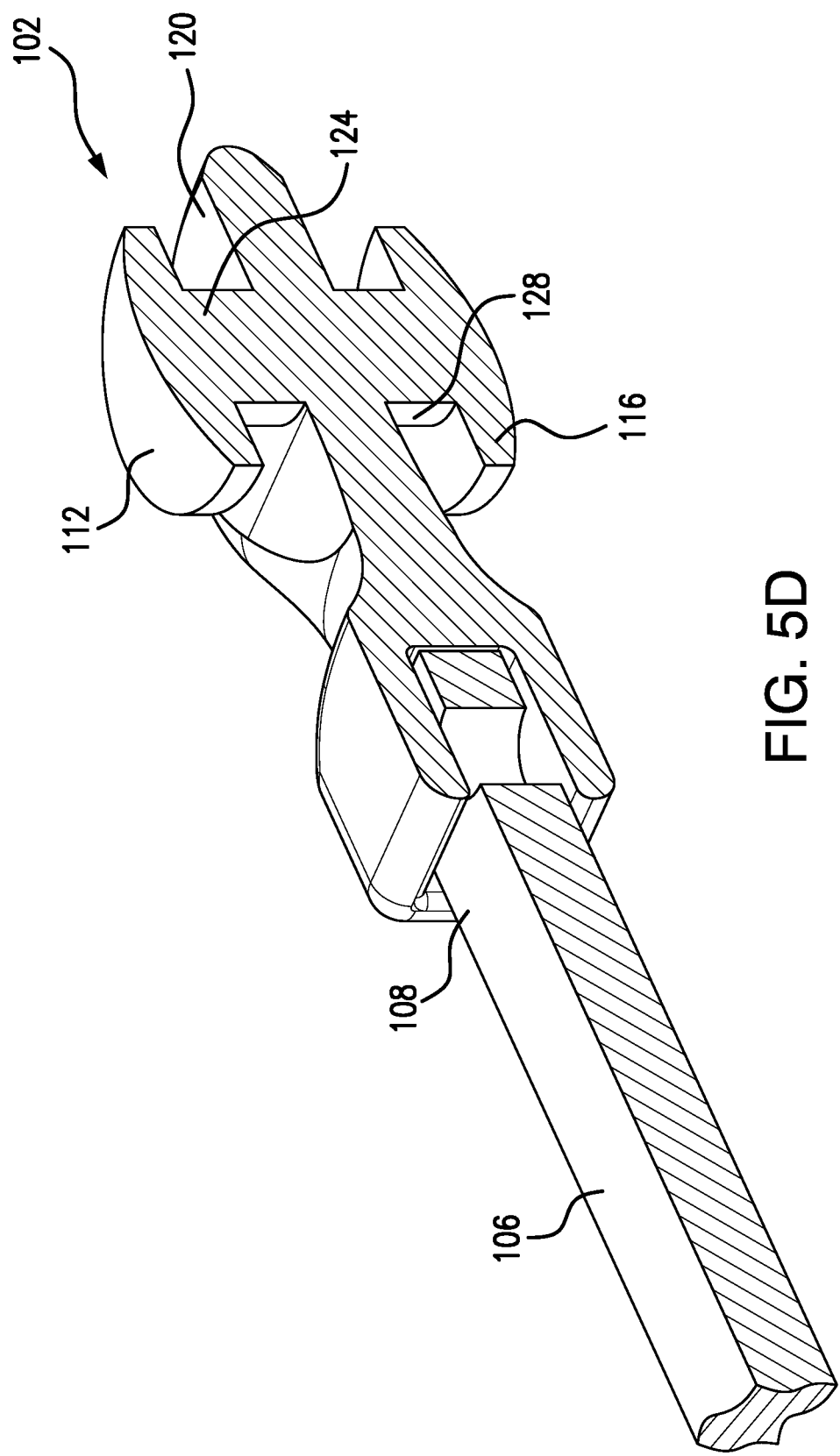
FIG. 5D is a cross-sectional partial view of a non-limiting example of an apparatus including a strap that is inserted into a connector according to some aspects.

In some aspects in which the first connector 102 and/or the second connector 104 is attached to the strap 106, as shown in FIGS. 3A-3E and 5A-5C, the strap 106 may be inserted into the first connector 102 (as shown in FIGS. 3A, 5A, 5C, and 5D) and/or the second connector 104 (as shown in FIGS. 3B and 5B). In some aspects, the first strap end 108 of the strap 106 may be inserted into the first connector 102 (as shown in FIGS. 3A, 5A, 5C, and 5D). In some aspects, the second strap end 110 of the strap 106 may be inserted into the second connector 104 (as shown in FIGS. 3B and 5B).

In some alternative aspects in which the first connector 102 and/or the second connector 104 is attached to the strap 106, as shown in FIGS. 6A and 6B, the first connector 102 may include one or more connector holes 604, and the strap 106 may include one or more first strap holes 602. Similarly, in some alternative aspects in which the first connector 102 and/or the second connector 104 is attached to the strap 106, as shown in FIGS. 6C and 6D, the second connector 104 may include one or more connector holes 608, and the strap 106 may include one or more second strap holes 606. In some aspects, the first connector 102 and/or the second connector 104 may be attached to the strap 106 using one or more rivets.

For example, in some aspects, the apparatus 100 may include one or more first rivets through the one or more first connector holes 604 and the one or more first strap holes 602, and the one or more first rivets may be configured to attach the first connector 102 to the first strap end 108 of the strap 106. In some aspects, the apparatus 100 may further include one or more second rivets through the one or more second connector holes 608 and the one or more second strap holes 606, and the one or more second rivets may be configured to attach the second connector 104 to the second strap end 110 of the strap 106.

In some further alternative aspects in which the first connector 102 and/or the second connector 104 is attached to the strap 106, as shown in FIGS. 9A-9D, the first connector 102 may include a platform 902, one or more connector heads 904, and one or more connector stakes 906 each extending from the platform 902 to a connector head 904, and the strap 106 may include one or more first strap holes 602. In some aspects, the one or more connector stakes 906 may each extend through a respective first strap hole 602, and the strap 106 may be between the one or more connector heads 904 and the platform 902 when the first connector 102 is attached to the strap 106. Similarly, in some alternative aspects in which the first connector 102 and/or the second connector 104 is attached to the strap 106, the second connector 104 may include a platform 902, one or more connector heads 904, and one or more connector stakes 906 each extending from the platform 902 to a connector head 904, and the strap 106 may include one or more second strap holes 606. In some aspects, the one or more connector stakes 906 may each extend through a respective second strap hole 606, and the strap 106 may be between the one or more connector heads 904 and the platform 902 when the second connector 104 is attached to the strap 106.

Figure 9A:
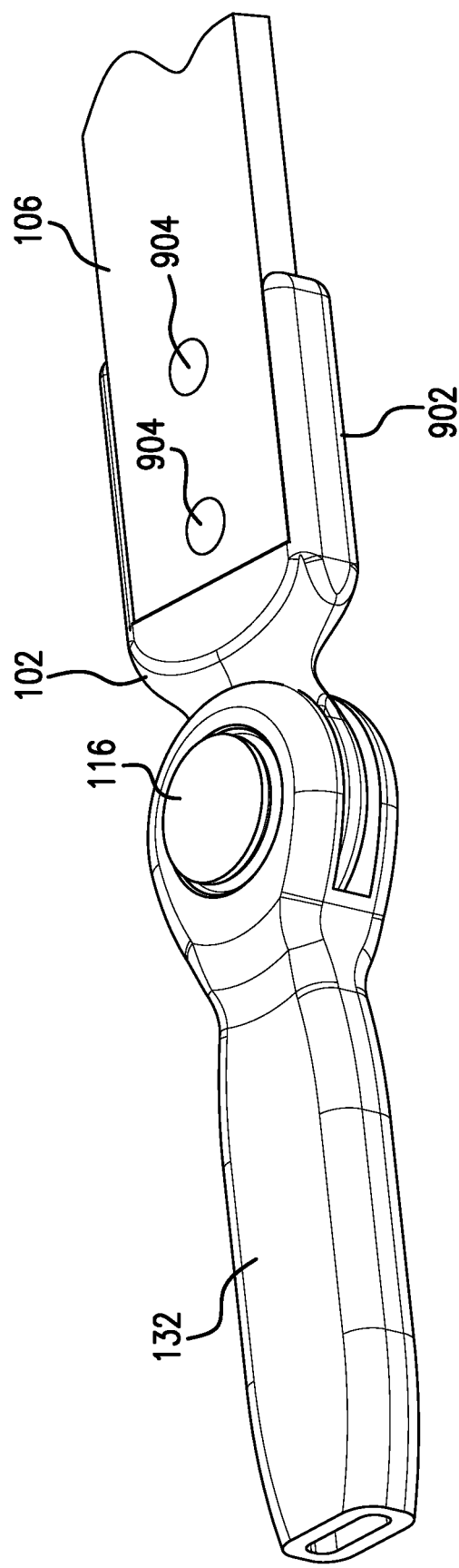
FIGS. 9A, 9B, and 9D are perspective views
Figure 9B:
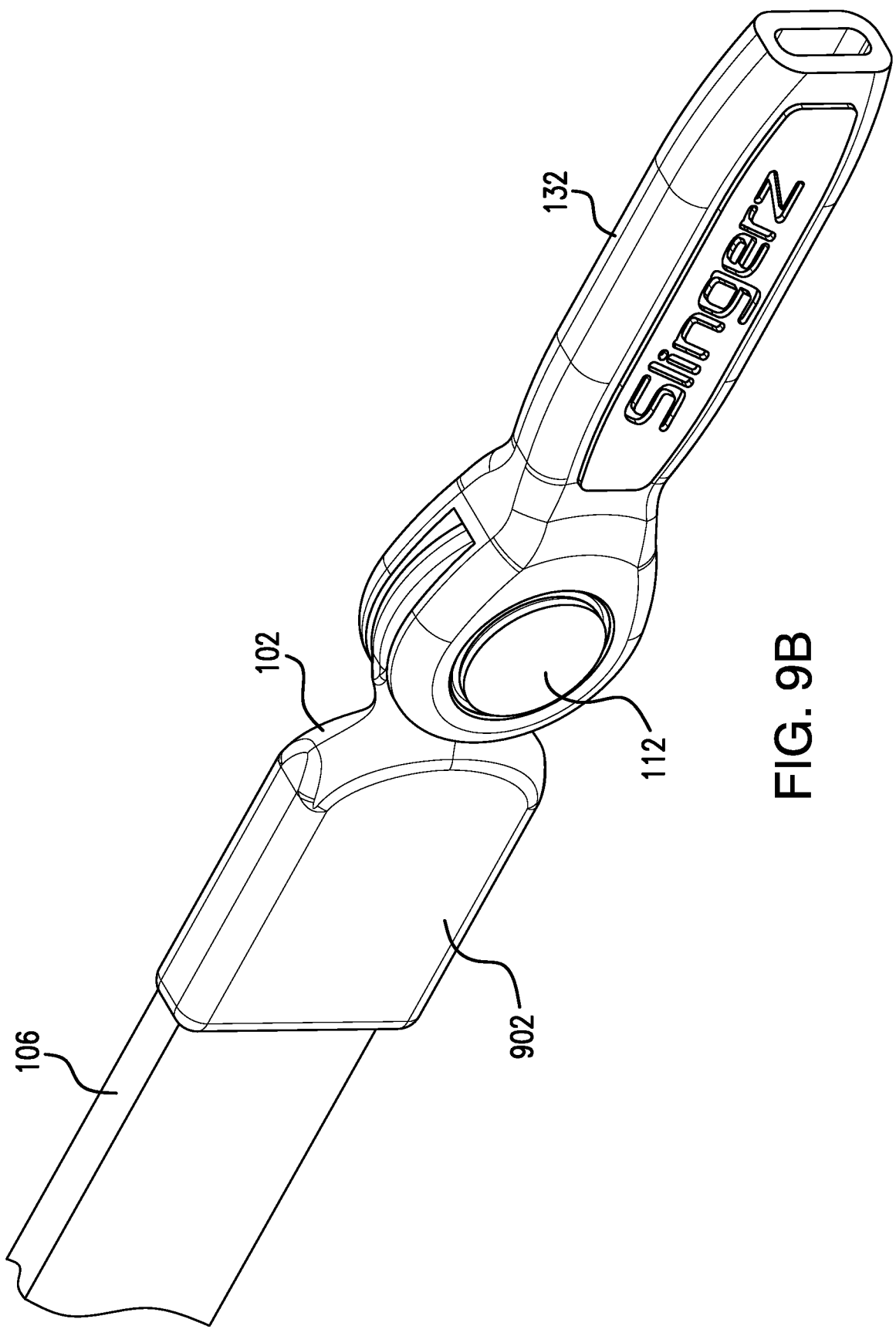
Figure 9C:
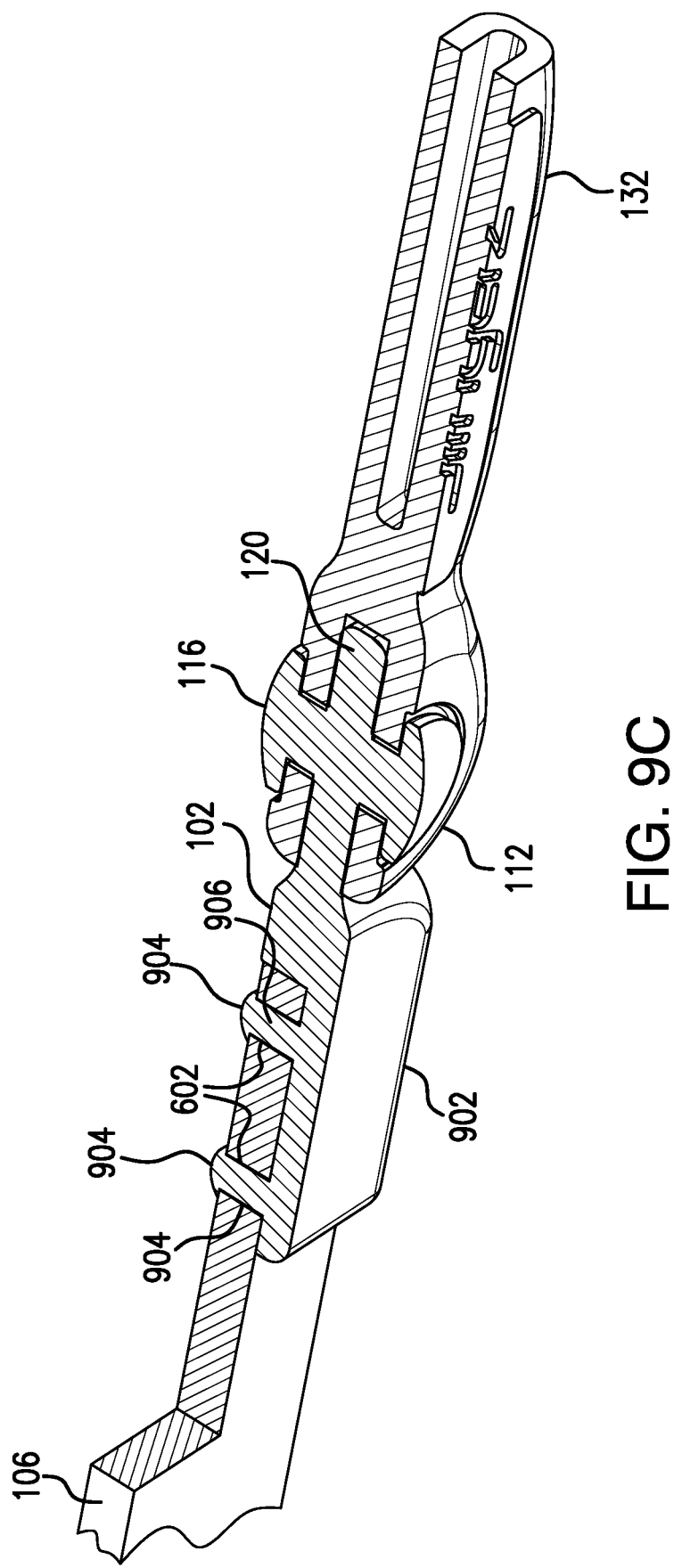
FIG. 9C is a cross-sectional view of a non-limiting example of an apparatus including a platform and one or more connector stakes in first and second connectors, and one or more strap holes in a strap for attaching the first and second connectors and the strap using the one or more connector stakes according to some aspects.
Figure 9D:
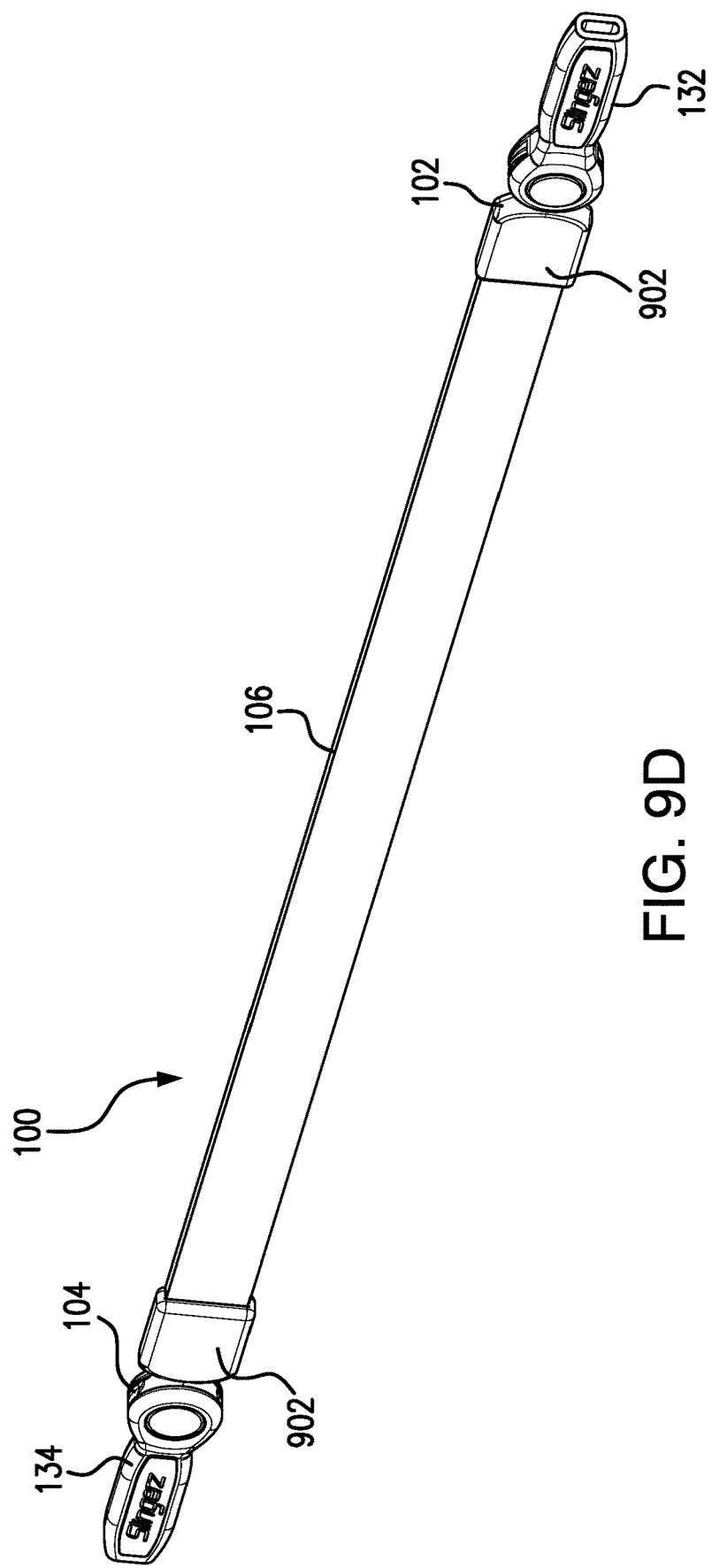

In some aspects, the one or more connector stakes 906 may be cylindrical. However, this is not required, and, in some alternative aspects, the one or more connector stakes 906 may have a different shape. In some aspects, as shown in FIGS. 9A-9D, the one or more connector heads 904 of the first and/or second connectors 102 and 104 may be dome-shaped. However, this is not required, and, in some alternative aspects, the one or more connector heads 904 may have a different shape. For example, in some alternative aspects, the top surfaces of the one or more connector heads 904 may include at least a flat portion. In some aspects, as shown in FIG. 9C, the one or more connector stakes 906 may extend from a flat surface of the platform 902.

In some aspects, as shown in FIGS. 3A and 3B, the strap 106 may be a round strap. However, this is not required, and, in some alternative aspects, the strap 106 may have a different cross-sectional shape. For example, in some alternative aspects, as shown in FIGS. 2A, 2B, 4A, 4B, 5A-5C, 6A-6D, 7A-7D, and 9A-9D, the strap 106 may be a flat strap 106. For another example, the strap 106 may be an oval strap.

In some aspects, as shown in FIGS. 1, 2B, 3C, 3D, 3E, 5C, 5D, 6B, 6D, and 9C, the first head 112 (and/or the third head 116) of the first connector 102 may include a surface (e.g., a flat surface) that faces the first base 120. In some aspects, the second head 114 (and/or fourth head 118) of the second connector 104 may include a surface (e.g., a flat surface) that faces the second base 122. In some aspects, the first base 120 may include a surface (e.g., a flat surface) that faces the first head 112, and the second base 122 may include a surface (e.g., a flat surface) that faces the second head 114. In some aspects, the first base 120 may include a surface (e.g., a flat surface) that faces the third head 116, and the second base 122 may include a surface (e.g., a flat surface) that faces the fourth head 118. In some aspects, the surfaces of one or more of the first, second, third, and fourth heads 112, 114, 116, and 118 that face the first or second bases 120 may be textured surfaces. In some aspects, the surfaces of the first and second bases 120 and 122 that face the first, second, third, and fourth heads 112, 114, 116, and 118, respectively, may additionally or alternatively be textured surfaces. In some aspects, the textured surface may include bumps, dots, protuberances, and/or ridges. In some aspects, the textured surfaces on the first, second, third, and fourth heads 112, 114, 116, and 118 may provide friction between the head 112, 114, 116, or 118 of a connector 102 or 104 and a connection layer 152, 154, 156, or 158 of a fastener 132 or 134. In some aspects, the textured surfaces on the first and second bases 120 and 122 may provide friction between the base 120 or 122 of a connector 102 or 104 and a connection layer 152, 154, 156, or 158 of a fastener 132 or 134. In some aspects, the textured surfaces may provide an amount of friction that both (a) allows the first and second connectors 102 and 104 (and the ends of the strap 106) to rotate relative to the first and second fastener 132 and 134, respectively (e.g., when a user moves the strap 106 relative to the first and second fastener 132 and 134) and (b) keeps the first and second connectors 102 and 104 (and the ends of the strap 106) at a fixed position relative to the first and second fastener 132 and 134, respectively (e.g., while a user is not moving the strap 106 relative to the first and second fastener 132 and 134).

In some aspects, as shown in FIGS. 2A and 3A, the strap 106 may include only a single component. However, this is not required, and, in some alternative aspects, as shown in FIGS. 4A and 7A-7D, the strap 106 may include a first strap component 404 and a second strap component 406. In some aspects, the first and second strap components 404 and 406 may enable the strap 106 to be adjustable in length. For example, some individuals using the apparatus 100 may manipulate the first strap component 404 and the second strap component 406 to adjust the length of the strap 106. For example, some individuals may desire to make the strap 106 longer to provide, for example, greater comfort when the apparatus 100 is in use.

Figure 7C:
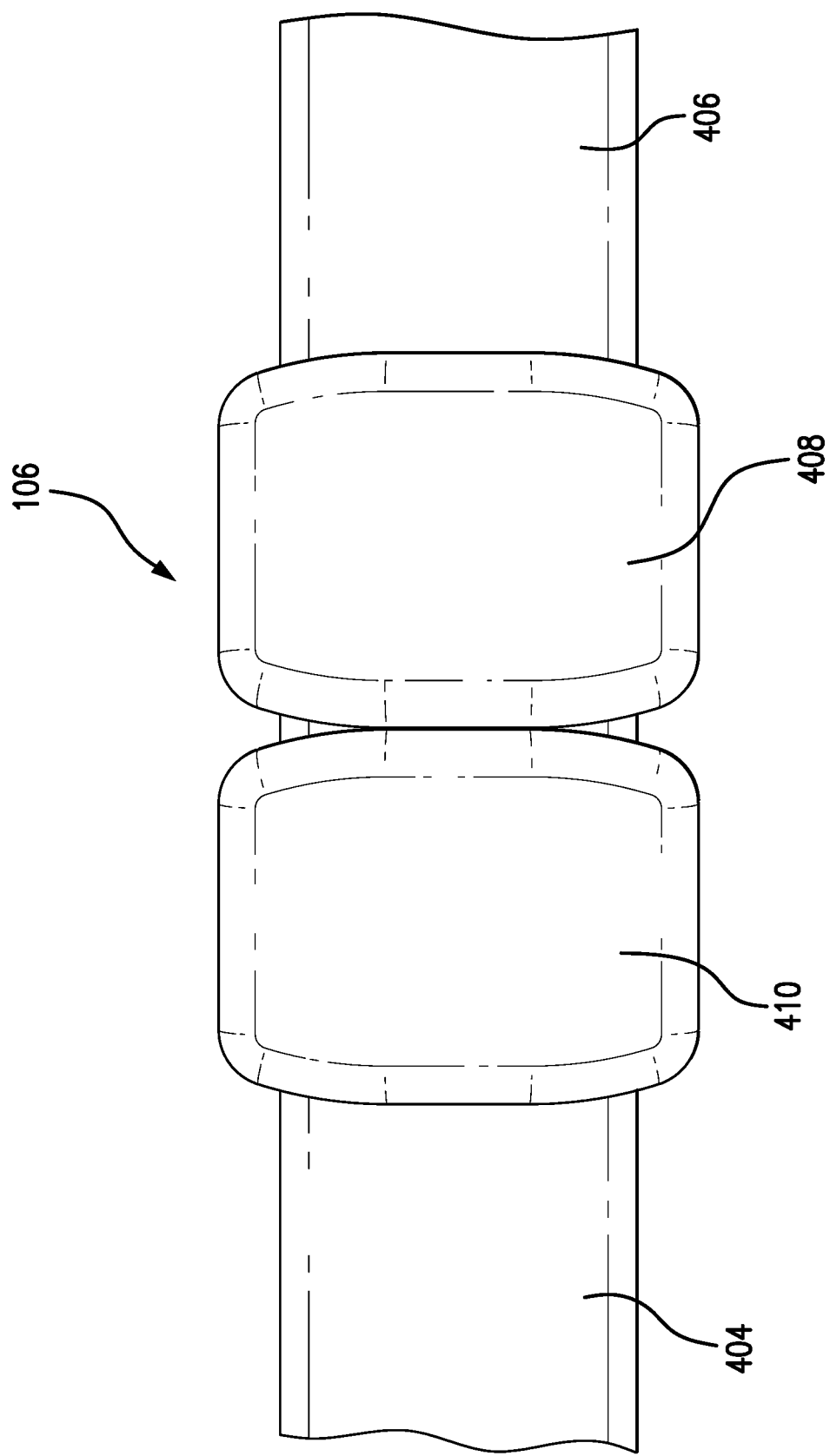
FIG. 7C is a top partial view of the adjustable length strap according to some aspects.
Figure 7D:
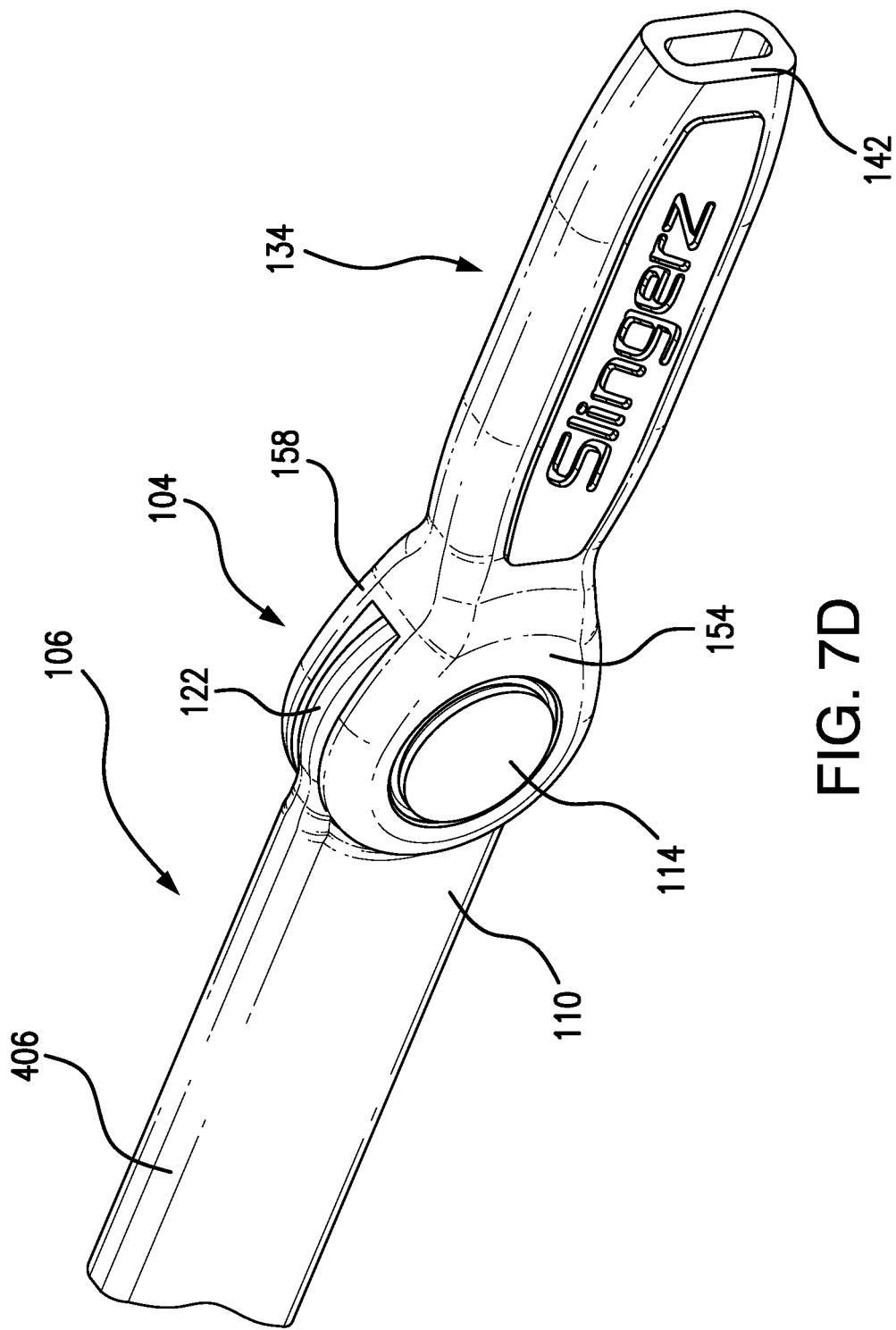
FIG. 7D is a perspective partial view of the non-limiting example of the apparatus including the adjustable length strap according to some aspects.

In some aspects in which the strap 106 includes the first and second strap components 404 and 406, as shown in FIGS. 4A and 7A-7C, as shown in FIGS. 7A-7C, the first strap component 404 may include the first strap end 108 and a first strap holder 408. In some aspects, the second strap component 406 may include the second strap end 110 and a second strap holder 410. In some aspects, the first strap component 404 may pass through the second strap holder 410, and the second strap component 406 may pass through the first strap holder 408. In some aspects, the first and second strap components 404 and 406 may include flat straps.

Figure 8A:
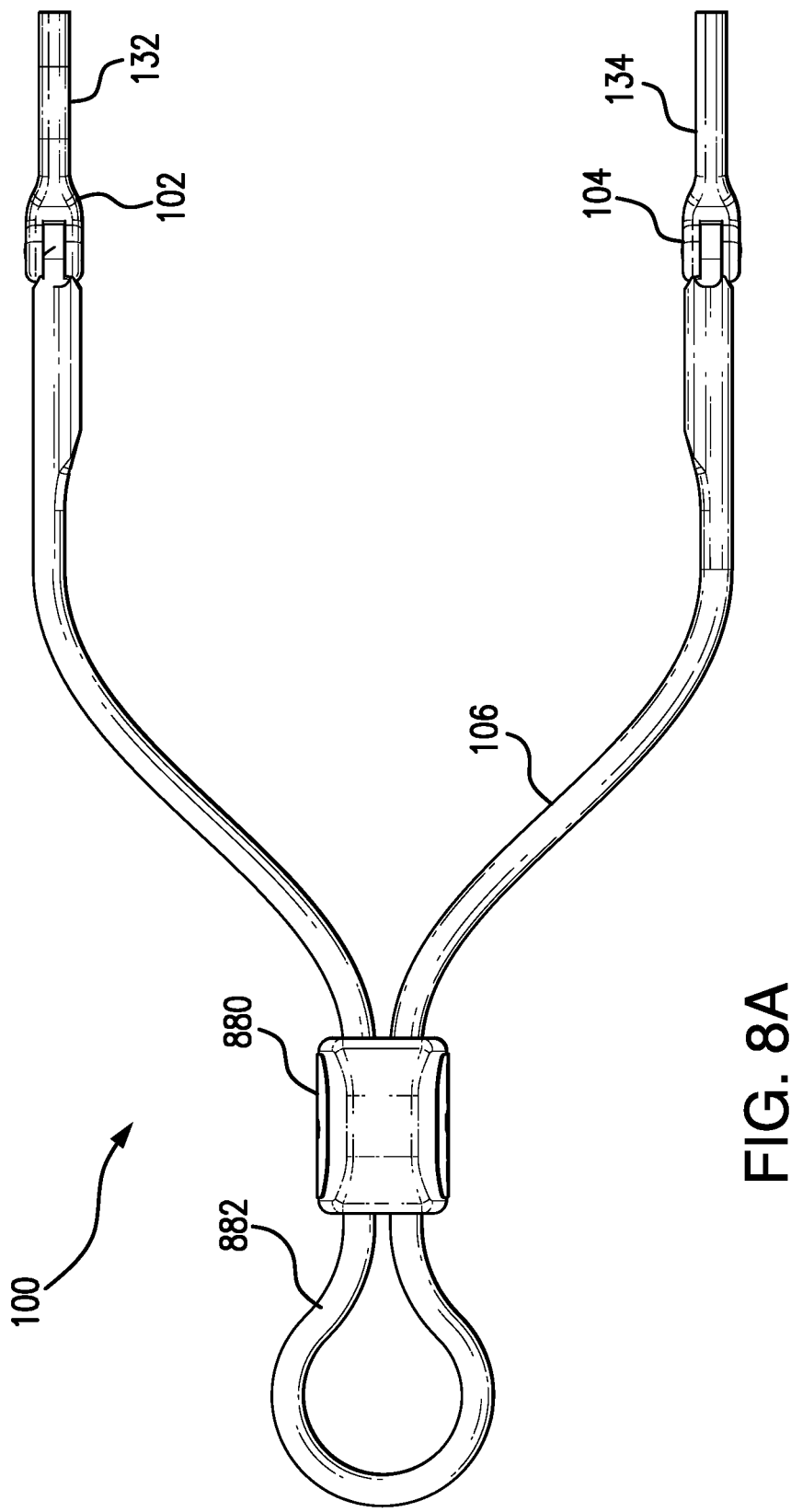
FIGS. 8A-8D are top, perspective, perspective, and side views, respectively, of a non-limiting example of an apparatus including an adjustable length strap according to some aspects.
Figure 8B:
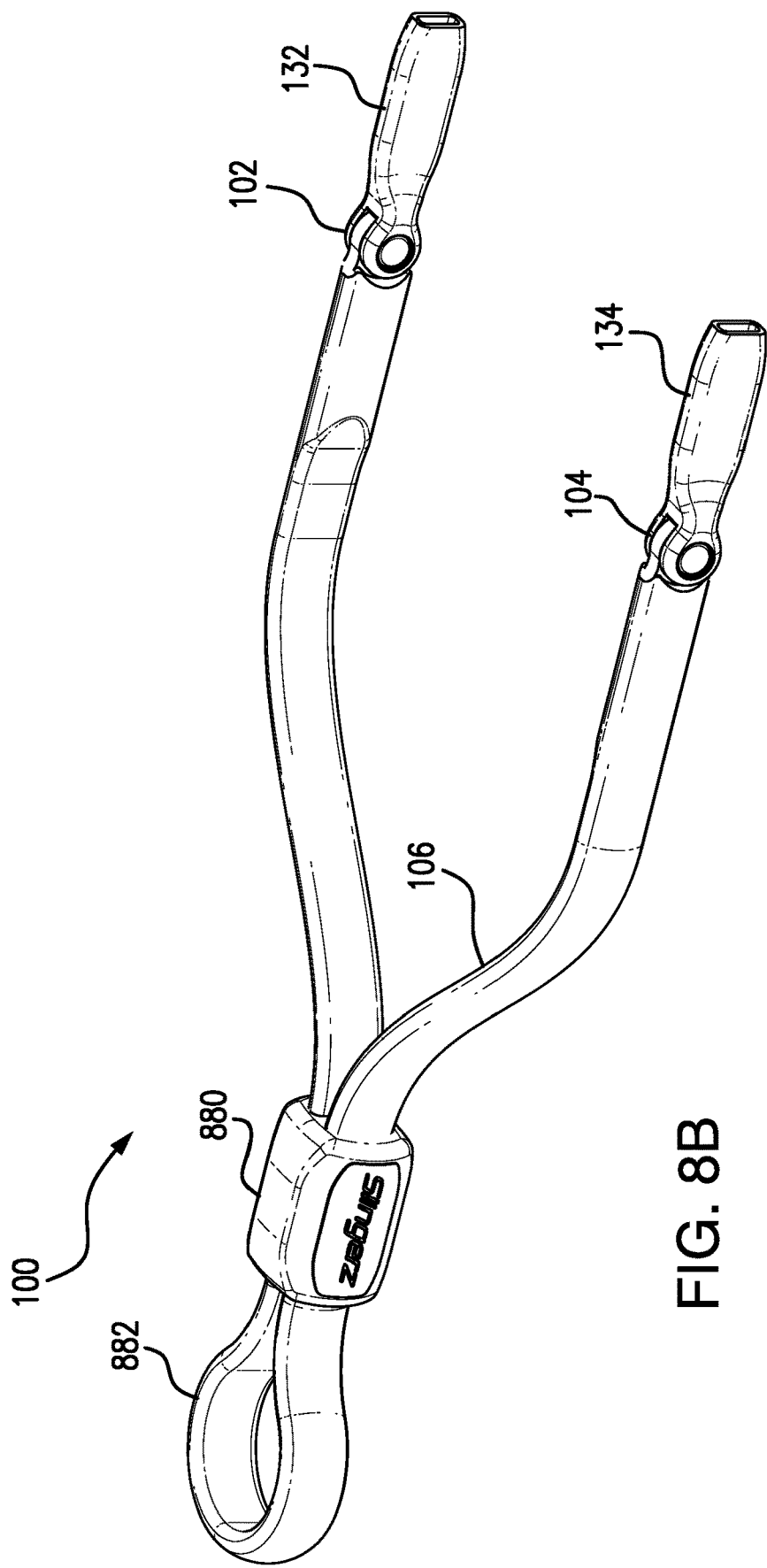
Figure 8C:
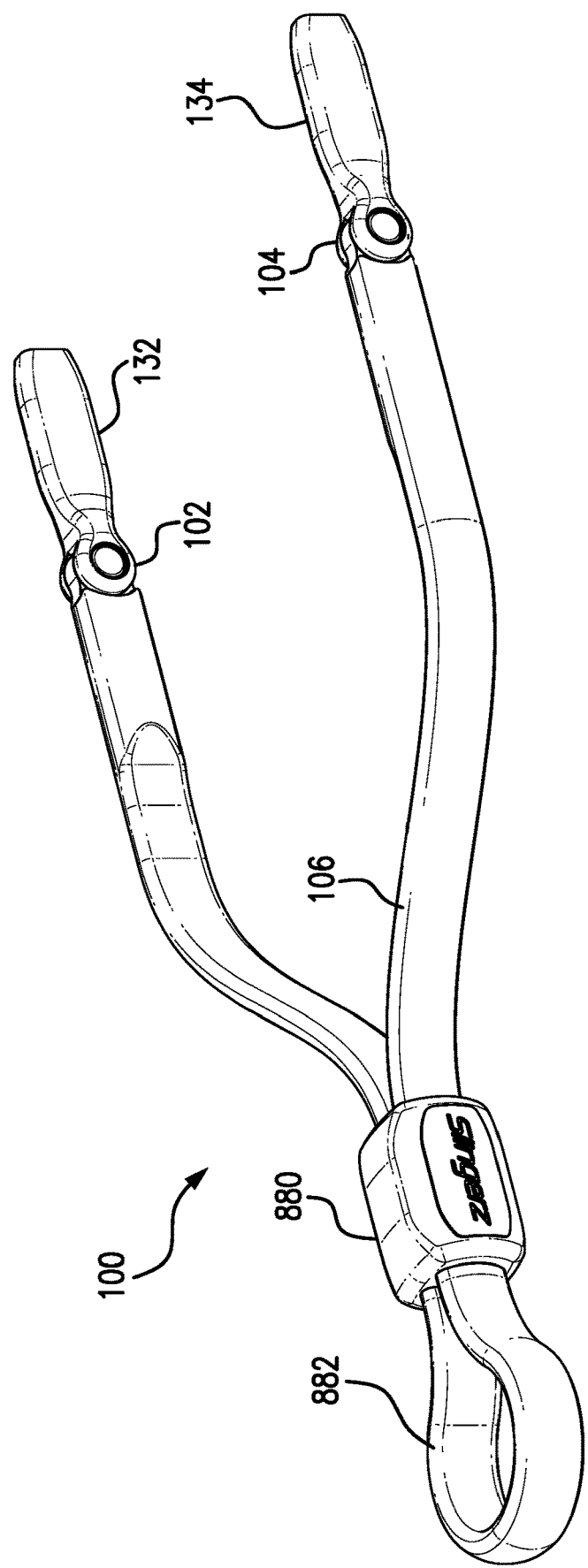
Figure 8D:
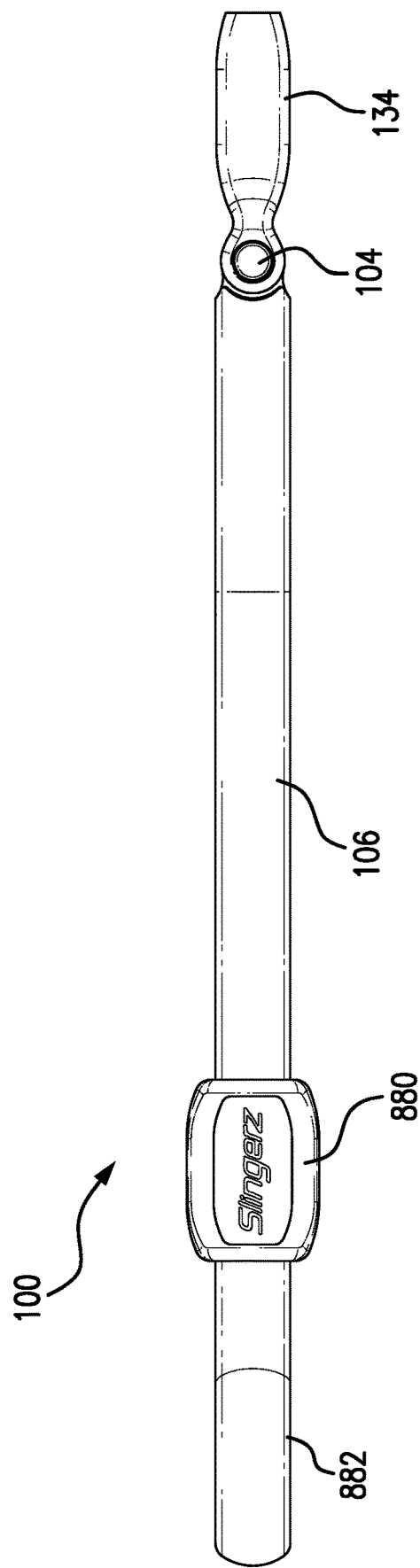
Figure 8E:
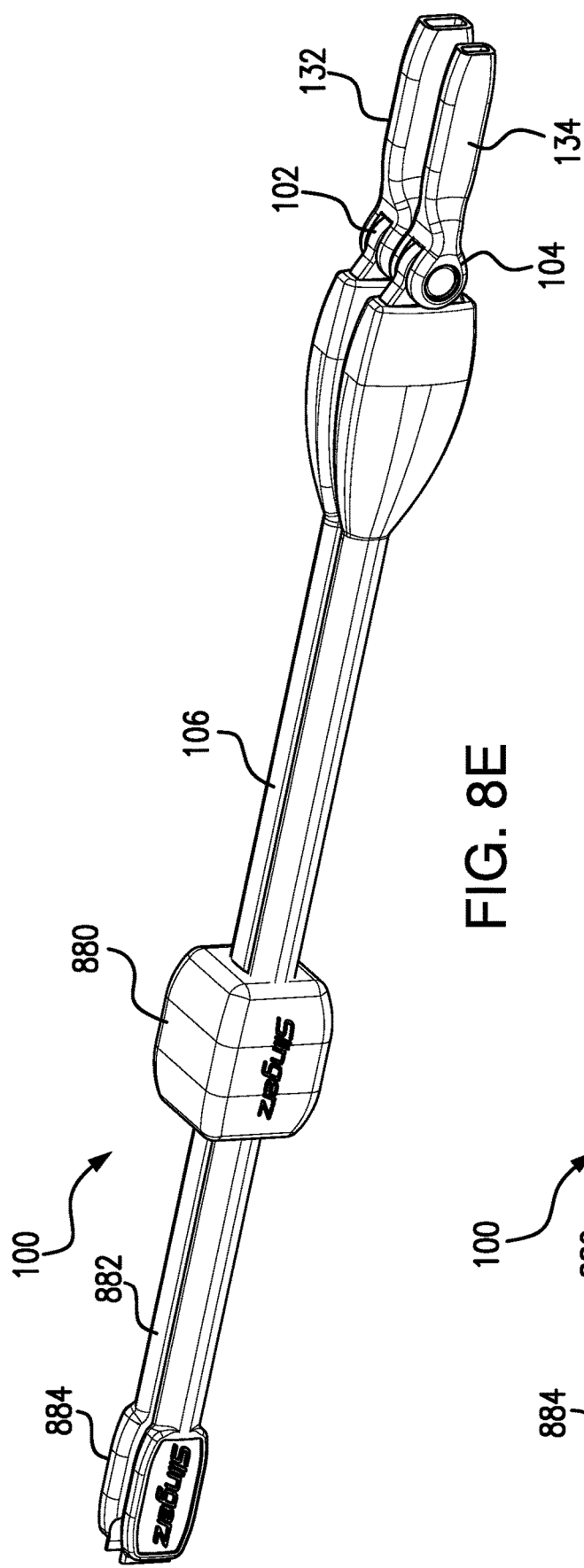
FIGS. 8E and 8F are perspective views of non-limiting examples of an apparatus including an adjustable length strap according to some aspects.
Figure 8F:
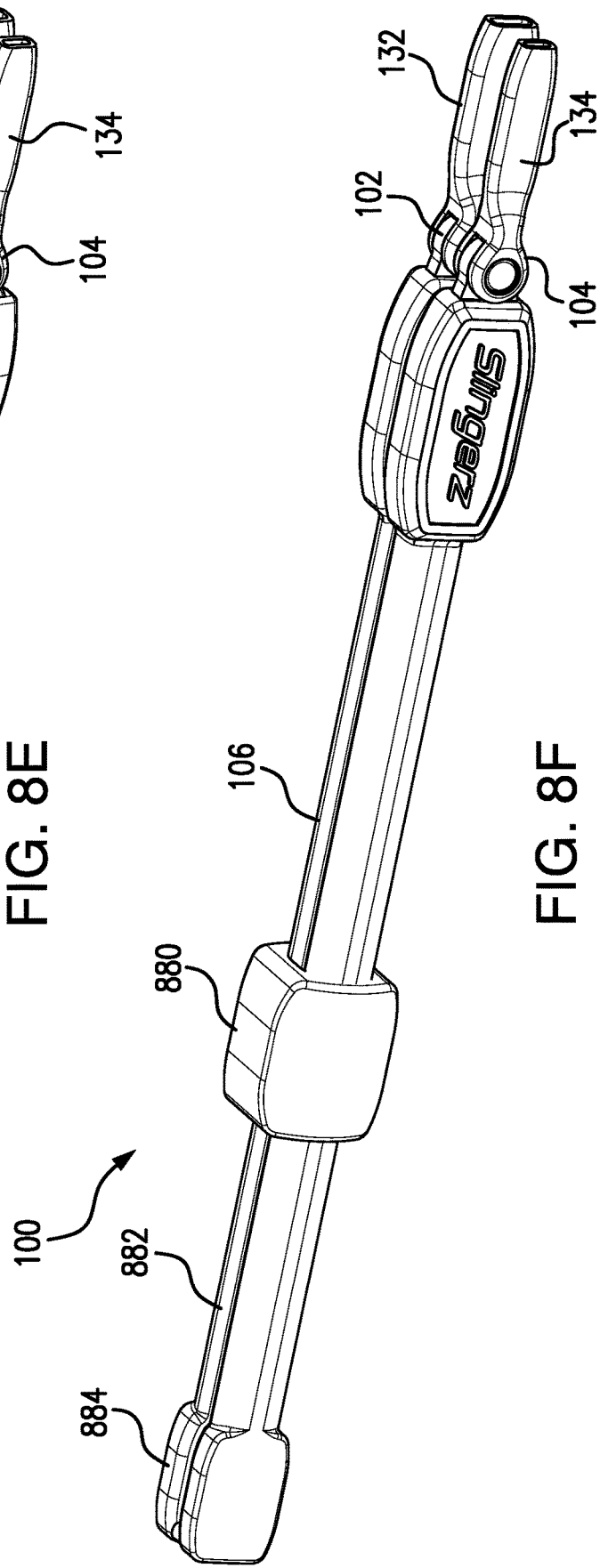

In some aspects, as shown in FIGS. 8A-8F, the apparatus 100 may include a strap length adjuster 880. In some aspects, the strap length adjuster 880 may enable the strap 106 to be adjustable in length. In some aspects, the strap 106 may pass through the strap length adjuster 880 and the back through the strap length adjuster 880 again to form a loop 882. In some aspects, a user may tighten/decrease the length of the strap 106 by increasing the portion of the strap 106 that forms the loop 882. In some aspects, a user may loosen/increase the length of the strap 106 by decreasing the portion of the strap 106 that forms the loop 882. In some aspects, as shown in FIGS. 8E and 8F, the apparatus 100 may include a tab 884 configured to assist the user pull the strap 106 through the strap length adjuster 880 (e.g., to tighten/decrease the length of the strap 106 by increasing the portion of the strap 106 that forms the loop 882). In some aspects, the tab 884 may additionally or alternatively be configured to prevent the strap length adjuster 880 from sliding off of the strap 106.

In any of the aspects described above, as shown in FIGS. 10A-12H, the first and second connectors 102 and 104 may include one or more ridges 1002 on the first and second bases 120 and 122 and/or one or more ridges 1004 on the first, second, third, and fourth heads 112, 114, 116, and 118. In some aspects, the first connector 102 may have one or more ridges 1002 on the side of the first base 120 facing the first head 112 and/or one or more ridges 1002 on the side of the first base 120 facing the third head 116. In some aspects, the second connector 104 may have one or more ridges 1002 on the side of the second base 122 facing the second head 114 and/or one or more ridges 1002 on the side of the second base 122 facing the fourth head 118. In some aspects, the ridges 1002 of the first connector 102 may extend radially from the first and third shafts 124 and 128, and the ridges 1002 of the second connector 104 may extend radially from the second and fourth shafts 126 and 130. In some aspects, the one or more ridges 1004 on the first head 112 may extend radially from the first shaft 124, the one or more ridges 1004 on the second head 114 may extend radially from the second shaft 126, the one or more ridges 1004 on the third head 116 may extend radially from the third shaft 128, and/or the one or more ridges 1004 on the fourth head 118 may extend radially from the fourth shaft 130.

In some aspects, as shown in FIGS. 10A-12H, there may be four ridges 1004 on each of the first through fourth heads 112, 114, 116, and 118 and/or four ridges 1002 on each side of each of the first and second bases 120 and 122. However, this is not required, and, in some alternative aspects, there may be a different number (e.g., one, two, three, five, six, eight, ten, etc.) of ridges 1004 on one or more of the first through fourth heads 112, 114, 116, and 118 and/or a different number (e.g., one, two, three, five, six, eight, ten, etc.) ridges 1002 on one or both sides of one or more of the first and second bases 120 and 122.

In some aspects, the ridges 1002 and 1004 may create friction against the first and second fasteners 132 and 134, respectively. In some aspects, the one or more ridges 1002 on the side of the first base 120 and/or the one or more ridges 1004 on the first head 112 of the first connector 102 may create friction against the first connection layer 152 of the first fastener 132. In some aspects, the one or more ridges 1002 on the side of the first base 120 facing the third head 116 and/or the one or more ridges 1004 on the third head 116 of the first connector 102 may create friction against the third connection layer 156 of the first fastener 132. In some aspects, the one or more ridges 1002 on the side of the second base 122 facing the second head 114 and/or the one or more ridges 1004 on the second head 114 of the second connector 104 may create friction against the second connection layer 154 of the second fastener 134. In some aspects, the one or more ridges 1002 on the side of the second base 122 facing the fourth head 118 and/or the one or more ridges 1004 on the fourth head 118 of the second connector 104 may create friction against the fourth connection layer 158 of the second fastener 134. In some aspects, the ridges 1002 and/or 1004 may slow and/or reduce movement of the first and second fasteners 132 and 134 relative to the first and second connectors 102 and 104, respectively. In some aspects, the ridges 1002 and/or 1004 may provide an amount of friction that both (a) allows the first and second connectors 102 and 104 (and the ends of the strap 106) to rotate relative to the first and second fastener 132 and 134, respectively (e.g., when a user moves the strap 106 relative to the first and second fastener 132 and 134) and (b) keeps the first and second connectors 102 and 104 (and the ends of the strap 106) at a fixed position relative to the first and second fastener 132 and 134, respectively (e.g., while a user is not moving the strap 106 relative to the first and second fastener 132 and 134).

FIGS. 10A-10H illustrate a non-limiting example of an apparatus 100 with first and second connectors 102 and 104 configured for use with a strap 106 that is round and 3 millimeters in diameter. FIGS. 11A-11H illustrate a non-limiting example of an apparatus 100 with first and second connectors 102 and 104 configured for use with a strap 106 that is flat with a width of 10 millimeters. FIGS. 12A-12H illustrate a non-limiting example of an apparatus 100 with first and second connectors 102 and 104 configured for use with a strap 106 that is flat with a width of 15 millimeters While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

PARTS LIST

Apparatus—100
First connector—102
Second connector—104
Strap—106
First strap end—108
Second strap end—110
First head—112
Second head—114
Third head—116
Fourth head—118
First base—120
Second base—122
First shaft—124
Second shaft—126
Third shaft—128
Fourth shaft—130
First fastener—132
Second fastener—134
First connection end—136
Second connection end—138
First attachment end—140
Second attachment end—142
First hole—144
Second hole—146
Third hole—148
Fourth hole—150
First connection layer—152
Second connection later—154
Third connection layer—156
Fourth connection layer—158
Overmolded piece—402
Overmolded piece—403
First strap component—404
Second strap component—406
First strap holder—408
Second strap holder—410
First strap holes—602
First connector holes—604
Second strap holes—606
Second connector holes—608
Strap length adjuster—880
Loop—882
Tab—884
Platform—902
Connector heads—904
Connector stakes—906
Ridges—1002
Ridges—1004

What is claimed is:

1. An apparatus for connecting first and second eyewear ends, the apparatus comprising:
a strap including a first strap end and a second strap end;
a first connector at the first strap end, wherein the first connector comprises a first base, a first head, and a first shaft extending between the first base and the first head, the first base comprises a surface that faces the first head, and the first head comprises a surface that faces the first base;
a second connector at the second strap end, wherein the second connector comprises a second base, a second head, and a second shaft extending between the second base and the second head, the second base comprises a surface that faces the second head, and the second head comprises a surface that faces the second base;
a first fastener including:
a first attachment end configured to attach removably to the first eyewear end; and
a first connection end comprising a first connection layer and a first hole through the first connection layer, wherein the first shaft of the first connector extends through the first hole of the first connection end of the first fastener, and the first connection layer is between the first base and the first head of the first connector; and
a second fastener including:
a second attachment end configured to attach removably to the second eyewear end; and
a second connection end comprising a second connection layer and a second hole through the second connection layer, wherein the second shaft of the second connector extends through the second hole of the second connection end of the second fastener, and the second connection layer is between the second base and the second head of the second connector;
wherein the surfaces of the first and second bases that face the first and second heads, respectively, and/or the surfaces of the first and second heads that face the first and second bases, respectively, are textured surfaces including bumps, dots, protuberances, and/or ridges; and
wherein:
an amount of friction of both (a) the surface of the first base that faces the first head and the surface of the first head that faces the first base against the first fastener is such that both (i) the first connector is allowed to rotate relative to the first fastener at times including when a user moves the strap relative to the first and second fasteners and (ii) the first connector is prevented from rotating relative to the first fastener at other times; and
an amount of friction of both (a) the surface of the second base that faces the second head and (b) the surface of the second head that faces the second base against the second fastener is such that both (i) the second connector is allowed to rotate relative to the second fastener at the times including when the user moves the strap relative to the first and second fasteners and (ii) the second connector is prevented from rotating relative to the second fastener at the other times.

2. The apparatus of claim 1, wherein:
the first connector further comprises a third head and a third shaft extending between the first base and the third head;

the second connector further comprises a fourth head and a fourth shaft extending between the second base and the fourth head;

the first connection end of the first fastener further comprises a third connection layer and a third hole through the third connection layer, wherein the third shaft of the first connector extends through the third hole of the first connection end of the first fastener, and the third connection layer is between the first base and the third head of the first connector; and the second connection end of the second fastener further comprises a fourth connection layer and a fourth hole through the fourth connection layer, wherein the fourth shaft of the second connector extends through the fourth hole of the second connection end of the second fastener, and the fourth connection layer is between the second base and the fourth head of the first connector.

3. The apparatus of claim 2, wherein the first and third shafts are coaxial, and the second and fourth shafts are coaxial.

4. The apparatus of claim 1, wherein the strap comprises the first and second connectors, the first connector is integral with the first strap end, and the second connector is integral with the second strap end.

5. The apparatus of claim 1, wherein the first connector is attached to the first strap end of the strap, and the second connector is attached to the second strap end of the strap.

6. The apparatus of claim 1, wherein the first head comprises a flat surface that faces the first base, and the second head comprises a flat surface that faces the second base.

7. The apparatus of claim 1, wherein:

the surfaces of the first and second bases that face the first and second heads, respectively, are textured surfaces, and the surfaces of the first and second head that face the first and second bases, respectively, are textured surfaces;

an amount of friction of both the textured surface of the first base and the textured surface of the first head against the first fastener is such that both (i) the first connector is allowed to rotate relative to the first fastener at the times including when the user moves the strap relative to the first and second fasteners and (ii) the first connector is prevented from rotating relative to the first fastener at the other times; and an amount of friction of both the textured surface of the second base and the textured surface of the second head against the second fastener is such that both (i) the second connector is allowed to rotate relative to the second fastener at the times including when the user moves the strap relative to the first and second fasteners and (ii) the second connector is prevented from rotating relative to the second fastener at the other times.

8. The apparatus of claim 1, wherein the surfaces of the first and second heads that face the first and second bases, respectively, are textured surfaces, the surface of the first head that faces the first base comprises one or more ridges, and the surface of the second head that faces the second base comprises one or more ridges.

9. The apparatus of claim 1, wherein the surfaces of the first and second bases that face the first and second heads, respectively, are textured surfaces, the surface of the first base comprises one or more ridges, and the surface of the second base comprises one or more ridges.

10. The apparatus of claim 1, wherein the first and second connectors are molded pieces, the first strap end of the strap is overmolded on the first connector, and the second strap end of the strap is overmolded on the second connector.

11. The apparatus of claim 1, wherein the first strap end of the strap is inserted into the first connector, and the second strap end of the strap is inserted into the second connector.

12. The apparatus of claim 1, wherein the first connector comprises one or more first connector holes, the second connector comprises one or more second connector holes, the first strap end of the strap comprises one or more first strap holes, the second strap end of the strap comprises one or more second strap holes.

13. The apparatus of claim 12, further comprising:

one or more first rivets through the one or more first connector holes and the one or more first strap holes, wherein the one or more first rivets are configured to attach the first connector to the first strap end of the strap; and one or more second rivets through the one or more second connector holes and the one or more second strap holes, wherein the one or more second rivets are configured to attach the second connector to the second strap end of the strap.

14. The apparatus of claim 1, wherein the first connector further comprises a platform and one or more connector stakes each extending from the platform, the first strap end of the strap comprises one or more first strap holes, and the one or more connector stakes each extend through a respective first strap hole of the one or more first strap holes.

15. The apparatus of claim 1, wherein the strap comprises a first strap component and a second strap component, the first strap component comprises the first strap end and a first strap holder, the second strap component comprises the second strap end and a second strap holder, the first strap component passes through the second strap holder, and the second strap component passes through the first strap holder.

16. An apparatus for connecting first and second eyewear ends, the apparatus comprising:

a strap including a first strap end and a second strap end;

a first connector at the first strap end, wherein the first connector comprises a first base, a first head, and a first shaft extending between the first base and the first head, the first base comprises a surface that faces the first head, and the surface of the first base comprises one or more ridges;

a second connector at the second strap end, wherein the second connector comprises a second base, a second head, and a second shaft extending between the second base and the second head, the second base comprises a surface that faces the second head, and the surface of the second base comprises one or more ridges;

a first fastener including:
a first attachment end configured to attach removably to the first eyewear end; and
a first connection end comprising a first connection layer and a first hole through the first connection layer, wherein the first shaft of the first connector extends through the first hole of the first connection end of the first fastener, and the first connection layer is between the first base and the first head of the first connector; and a second fastener including:
a second attachment end configured to attach removably to the second eyewear end; and
a second connection end comprising a second connection layer and a second hole through the second connection layer, wherein the second shaft of the second connector extends through the second hole of the second connection end of the second fastener, and the second connection layer is between the second base and the second head of the second connector.

17. The apparatus of claim 16, wherein the first head comprises a surface that faces the first base, the surface of the first head that faces the first base comprises one or more ridges, the second head comprises a surface that faces the second base, and the surface of the second head that faces the second base comprises one or more ridges.

18. An apparatus for connecting first and second eyewear ends, the apparatus comprising:
a strap including a first strap end and a second strap end;
a first connector at the first strap end, wherein the first connector comprises a first base, a first head, and a first shaft extending between the first base and the first head, the first head comprises a surface that faces the first base, and the surface of the first head that faces the first base comprises one or more ridges;
a second connector at the second strap end, wherein the second connector comprises a second base, a second head, and a second shaft extending between the second base and the second head, the second head comprises a surface that faces the second base, and the surface of the second head that faces the second base comprises one or more ridges;
a first fastener including:
a first attachment end configured to attach removably to the first eyewear end; and
a first connection end comprising a first connection layer and a first hole through the first connection layer, wherein the first shaft of the first connector extends through the first hole of the first connection end of the first fastener, and the first connection layer is between the first base and the first head of the first connector; and
a second fastener including:
a second attachment end configured to attach removably to the second eyewear end; and
a second connection end comprising a second connection layer and a second hole through the second connection layer, wherein the second shaft of the second connector extends through the second hole of the second connection end of the second fastener, and the second connection layer is between the second base and the second head of the second connector.

19. An apparatus for connecting first and second eyewear ends, the apparatus comprising:
a strap including a first strap end and a second strap end;
a first connector at the first strap end, wherein the first connector comprises a first base, a first head, and a first shaft extending between the first base and the first head, the first head comprises a surface that faces the first base;
a second connector at the second strap end, wherein the second connector comprises a second base, a second head, and a second shaft extending between the second base and the second head, the second head comprises a surface that faces the second base;
a first fastener including:
a first attachment end configured to attach removably to the first eyewear end; and
a first connection end comprising a first connection layer and a first hole through the first connection layer, wherein the first shaft of the first connector extends through the first hole of the first connection end of the first fastener, and the first connection layer is between the first base and the first head of the first connector; and
a second fastener including:
a second attachment end configured to attach removably to the second eyewear end; and
a second connection end comprising a second connection layer and a second hole through the second connection layer, wherein the second shaft of the second connector extends through the second hole of the second connection end of the second fastener, and the second connection layer is between the second base and the second head of the second connector;
wherein the surfaces of the first and second heads that face the first and second bases, respectively, are textured surfaces including bumps, dots, protuberances, and/or ridges; and
wherein an amount of friction of the textured surfaces of the first and second heads against the first and second fasteners, respectively, is such that both (i) the first and second connectors are allowed to rotate relative to the first and second fasteners, respectively, at times including when a user moves the strap relative to the first and second fasteners and (ii) the first and second connectors are prevented from rotating relative to the first and second fasteners, respectively, at other times.

* * * * *